US009536228B2

(12) United States Patent
Vernon et al.

(10) Patent No.: US 9,536,228 B2
(45) Date of Patent: Jan. 3, 2017

(54) CONTACT MANAGEMENT SYSTEMS

(71) Applicant: Gretel LLC, West Palm Beach, FL (US)

(72) Inventors: William Earl Vernon, Lake Worth, FL (US); Lisabet Summa, Lake Worth, FL (US)

(73) Assignee: Gretel, LLC, West Palm Beach, FL (US)

( * ) Notice: Subject to any disclaimer, the term of this patent is extended or adjusted under 35 U.S.C. 154(b) by 0 days.

(21) Appl. No.: 14/448,310

(22) Filed: Jul. 31, 2014

(65) Prior Publication Data

US 2016/0037331 A1   Feb. 4, 2016

(51) Int. Cl.
| | |
|---|---|
| G06F 17/30 | (2006.01) |
| G06Q 10/10 | (2012.01) |
| H04L 29/08 | (2006.01) |
| H04M 1/2745 | (2006.01) |
| H04L 12/58 | (2006.01) |
| H04W 4/08 | (2009.01) |

(52) U.S. Cl.
CPC ............. *G06Q 10/107* (2013.01); *H04L 51/28* (2013.01); *H04L 51/38* (2013.01); *H04L 67/306* (2013.01); *H04L 51/00* (2013.01); *H04M 1/274516* (2013.01); *H04W 4/08* (2013.01); *Y02B 60/50* (2013.01)

(58) Field of Classification Search
USPC .................................. 235/375; 707/999.001
See application file for complete search history.

(56) References Cited

U.S. PATENT DOCUMENTS

| | | |
|---|---|---|
| 5,806,075 A | 9/1998 | Jain et al. |
| 6,175,831 B1 | 1/2001 | Weinreich et al. |
| 6,269,369 B1 | 7/2001 | Robertson |
| 7,069,308 B2 | 6/2006 | Abrams |
| 7,188,153 B2 | 3/2007 | Lunt et al. |
| 7,194,419 B2 | 3/2007 | Robertson et al. |
| 7,269,590 B2 | 9/2007 | Hull et al. |
| 7,478,078 B2 | 1/2009 | Lunt et al. |
| 7,707,122 B2 | 4/2010 | Hull et al. |
| 7,725,492 B2 | 5/2010 | Sittig et al. |
| 7,739,139 B2 | 6/2010 | Robertson et al. |
| 7,822,761 B2 | 10/2010 | Kussmaul et al. |
| 7,904,511 B2 | 3/2011 | Ryan et al. |
| 7,925,620 B1 | 4/2011 | Yoon |
| 7,949,611 B1 | 5/2011 | Nielsen et al. |
| 8,010,458 B2 | 8/2011 | Galbreath et al. |
| 8,041,595 B2 | 10/2011 | Robertson et al. |
| 8,126,759 B2 | 2/2012 | Robertson et al. |

(Continued)

OTHER PUBLICATIONS

International Search Report dated Nov. 2, 2015, issued in International Application No. PCT/US15/42920 (2 pages).

*Primary Examiner* — Daniel Hess
(74) *Attorney, Agent, or Firm* — Beem Patent Law Firm

(57) ABSTRACT

An improved contact management system allows users to establish contact sharing relationships with one another and store updating contacting information for these users alongside static contact information for other users in personal, private data collections. The system may allow a user to specify various levels of information sharing and customize communication options by which other users may contact them. The system may provide seamless integration with legacy contact management and/or and communication systems.

20 Claims, 36 Drawing Sheets

(56) References Cited

U.S. PATENT DOCUMENTS

| | | |
|---|---|---|
| 8,145,712 B2 | 3/2012 | Harik et al. |
| 8,219,500 B2 | 7/2012 | Galbreath et al. |
| 8,751,582 B1 | 6/2014 | Behforooz et al. |
| 2004/0234071 A1* | 11/2004 | Bae .................. H04M 1/02 379/419 |
| 2005/0149487 A1* | 7/2005 | Celik .................. G06Q 10/10 |
| 2007/0192299 A1 | 8/2007 | Zuckerberg et al. |
| 2007/0255807 A1 | 11/2007 | Hayashi et al. |
| 2010/0144331 A1 | 6/2010 | Koberg et al. |
| 2010/0304725 A1 | 12/2010 | Gueron et al. |
| 2012/0179764 A1 | 7/2012 | Erdal |
| 2012/0203846 A1 | 8/2012 | Hull et al. |
| 2014/0188681 A1 | 7/2014 | Shahghasemi |

\* cited by examiner

CONTACT MANAGEMENT SYSTEMS

BACKGROUND OF THE INVENTION

1. Technical Field

The present application relates to contact management systems and methods, and, more specifically, to a networked system for managing and updating contact information among interconnected users.

2. Related Art

In our ever expanding digital world, information is accumulating at astounding rates. Contact information is no exception to this trend. The interconnectedness brought on by the Internet and the proliferation of wireless devices has made it commonplace for a person to have many points of contact, including multiple email addresses, multiple wireless telephone numbers, multiple traditional telephone numbers, multiple physical addresses, and the like. Considering the average person knows about 600 people, managing all of this information can be daunting.

Traditional contact management systems attempt to manage this information by providing stand-alone software solutions that requires users to enter and store contact information for the people they know. However, these systems rely on users to have accurate information for their respective contacts in the first instance. Traditional contact management systems also rely on users to update the information stored therein as a contact's information changes over time, leaving users with no way to differentiate the good information from the bad. As a result, traditional contact management systems are unreliable and labor intensive.

Accordingly, a need has long existed for an improved contact management system.

SUMMARY

An improved contact management system implements several technical solutions to the technical problems associated with efficiently, flexibly, and reliably maintaining contact information and other related functions in order to facilitate communications between users of the system with one another as well as their contacts. As a result, the contact management system reduces the difficulty, cost, and time expenditures typically associated with finding reliable contact information and initiating communications with one's contacts. The contact management system also eliminates duplicative storage of information and reduces the number of processing of events which in turn reduces power consumption and otherwise improves the performance of communications devices such as mobile device.

One technical solution, for example, lies in allowing users to establish contact sharing relationships with one another and store updating contacting information for these users alongside static contact information for other users in personal, private data collections, and also may allow users to specify various levels of information sharing. As a result, the system provides a single location for reliable contact information, freeing users from having to load and navigate through multiple contact management applications to find a contact's information. This increases system performance because these load and navigation operations cause data to be loaded into and out of memory, processers to perform operations, displays to be updated, and the like. This also eliminates the duplicative storage of information among these various applications. In addition, because a connected user's information is accurate, the user may reliably contact a connected user on the first try. This eliminates, for example, extraneous phone calls, emails, and the like caused by outdated contact information. These features increase the performance of the user's device (such as, for example, by reducing processing events like phone calls and email compositions and transmissions, etc.) and also reduce the processing burden placed on communication networks like cellular communication networks and the Internet generally.

As another example, a technical solution lies in allowing users to customize communication options by which other users may contact them. Again, this eliminates, for example, extraneous phone calls, emails, and the like caused by outdated contact information and increases the performance of the user's device (such as for example by reducing processing events like phone calls and email compositions and transmissions, etc.) and also reduces the processing burden placed on communication networks like cellular communication networks and the Internet generally.

Yet another technical solution lies in providing seamless integration with legacy contact management and/or communication systems. Because legacy communication systems are often resident in memory by default, leveraging these existing systems does not place a further burden on the device to load, for example, duplicative phone calling applications. Integration with legacy contact management systems allows the system to have all relevant contact information for a user in one application (i.e. a one-stop shop for contact information), which provides several technical advantages as noted above.

Other systems, methods, features and technical advantages of the invention will be, or will become apparent to one with skill in the art upon examination of the following figures and detailed description. It is intended that all such additional systems, methods, features and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the contact management system architecture may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the communications architecture will be described, methods, systems, and articles of manufacture consistent with the contact management system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems.

Figure 1:
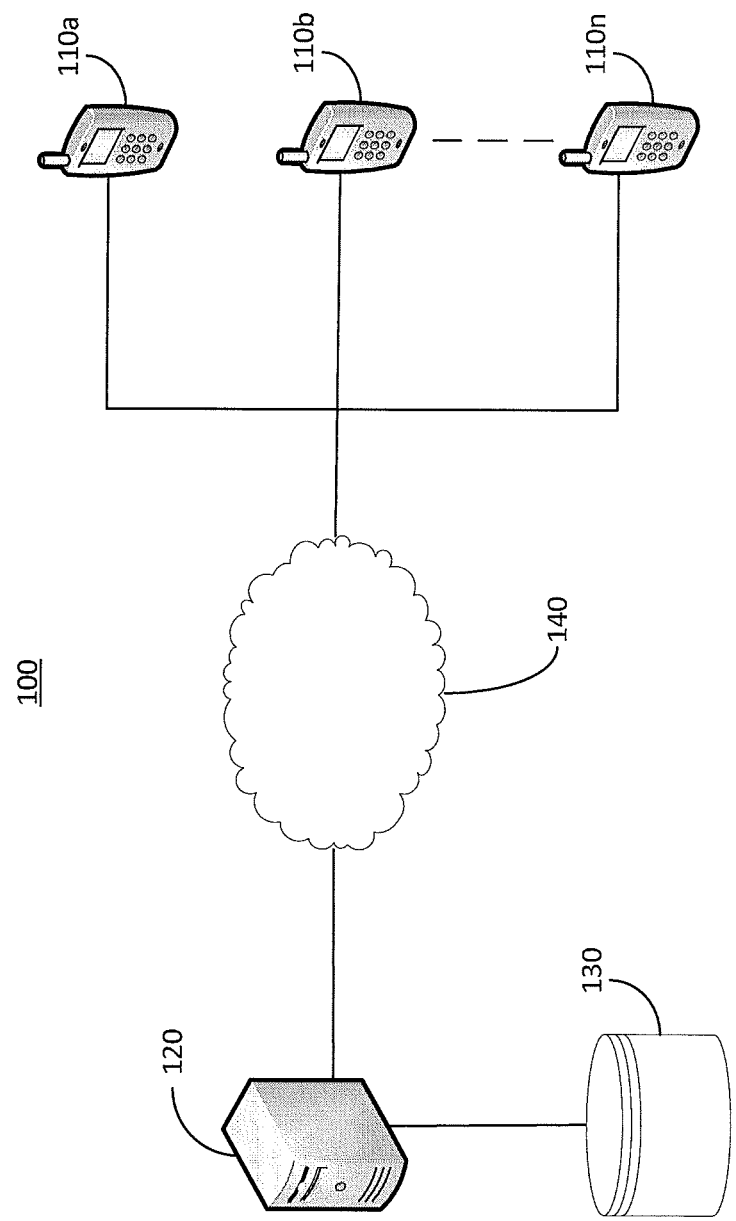
FIG. 1 shows an exemplary physical architecture for implementing a contact management system for managing and updating the contact information of a plurality of users.

Referring to FIG. 1, an exemplary hardware architecture 100 including a contact management system for managing and updating the contact information of a plurality of users is shown. The architecture 100 may include two or more user client systems 110a, 110b, and 110n, a contact management server 120, a database 130, and a communications network 140. Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, although figuratively attached to contact management server 120, the database 130 may, in practice, distribute user-specific data elements directly to one or more client systems 110a, 110b, and 110n. Similarly, the contact management server 120 may be implemented as a single server configured to provide all of the system's functionalities, or the functionalities may be implemented across multiple servers.

The client systems 110a, 110b, and 110n implement client applications that provide a user interface for the system 100 and may communicate user profile, contact, and other information with contact management server 120 via communications network 140. Communications network 140 may be any private or public communication network, such as the Internet, and may include one or more communications networks. In one embodiment, client systems 110a, 110b, and 110n may comprise stand-alone applications which may be either platform dependent or platform independent. For example, client systems 110a, 110b, and 110n may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client systems 110a, 110b, and 110n may connect to the contact management server 120 via the Internet using a standard browser application. A browser based implementation allows system features to be accessible regardless of the underlying platform of the client system 110a, 110b, and 110n. Alternatively, or additionally, one or more of the client systems 110a, 110b, and 110n may be a workstation computer, laptop computer, handheld computer, tablet, mobile messaging device, or the like which may all utilize different hardware and/or software packages. Other methods may be used to implement the client systems 110a, 110b, and 110n.

The contact management server 120 may exchange user profile, contact, and other information with the client systems 110a, 110b, and 110n. In operation, the contact management server 120 and client systems 110a, 110b, and 110n may, for example, allow a user to establish a personal and private network for personal, commercial, and professional relationships, automate building a network of a user by compiling and organizing the contact information of current and future contacts, provide an updating collection of personal and professional contact information of other users in a user's network through the use of contact information sharing relationships, and/or facilitate communication with connected users through legacy communication functionalities. As should be apparent to one of ordinary skill in the art from the disclosure herein, other related services may also be provided.

A user may be an individual, a commercial entity, or any other type of entity. For example, an individual user that is a member of a team or club may establish a contact sharing relationship with an organization entity user, thereby allowing the individual user to share their contact information with all other members of the team or club. In one embodiment, an individual user may establish a contact sharing relationship with a commercial entity, ensuring that the commercial entity has, for example, the proper shipping address for the individual. In some embodiments, a user may be compensated for establishing a relationship with a commercial entity.

In one embodiment, contact information may be pushed from a first user to a second user. In such an embodiment, a first user may invite a second user to have access to some or all of the first user's contact information without a reciprocal request for access to the second user's information. Alternatively, or additionally, a pull relationship in which contact information may be request from the second user, or a mutual sharing relationship in which both users may have access to the others information, may be requested by the first user. In some embodiment, all three options may be provided.

The database 130 may store a variety of information, including contact information, user profile information, user preference information, user connection/relationship information, and the like. In one embodiment, the database may store, for each user, a copy of a full address book containing updating and/or non-updating contact information for each contact of the user. For example, database 130 may comprise a plurality of tables in one or more relational databases. In one embodiment, the database 130 may include a USER_SIGNUP table for storing user information for a registered user, a USER_SIGNUP_TEMP table for storing temporary information used during a sign-up process, a USER_CONTACTS table for storing contact information for a registered user's contacts, an INVITE_GRETEL table for storing information about an invitation to connect with a registered user of the service to establish a contact information sharing relationship, an INVITE_GRETEL_ME for storing information relating to an invitation to connect with a non-registered user to establish a contact information sharing relationship, a GROUP table for storing information defining a group of contacts, a GROUP_MEMBER table for storing group membership information, an ADMIN_LOGIN table for storing information relating to login credentials of administrators to access the backend dashboard, and an ADMIN_NOTIFICATION table for storing information for storing information relating to messages sent by administrators to registered users. Exemplary table definitions for these tables are set forth in Appendix A. The database may include other tables, use other organizational structures and/or store more or less items of data. Other types of databases, such as eXstensible Markup Language (XML) databases and other storage mechanisms also may be used.

In one embodiment, the contact management server 120 and database 130 may comprise one or more instances of an Amazon Elastic Compute Cloud™ (Amazon EC2™) Web Server (Amazon™) utilizing one or more of the following storage mechanisms: Amazon Simple Storage Service™ (Amazon S3™) Amazon Relational Database Service™ (Amazon RDS™), Amazon SimpleDB™ and Amazon Simple Queue Service™ (Amazon SQS™). For example, each set of contact information for a given user may be stored in one or more Amazon RDS™, user images may be stored in one or more Amazon S3™, and requests to the server 120 may be stored in one or more Amazon SQS™.

Figure 2:
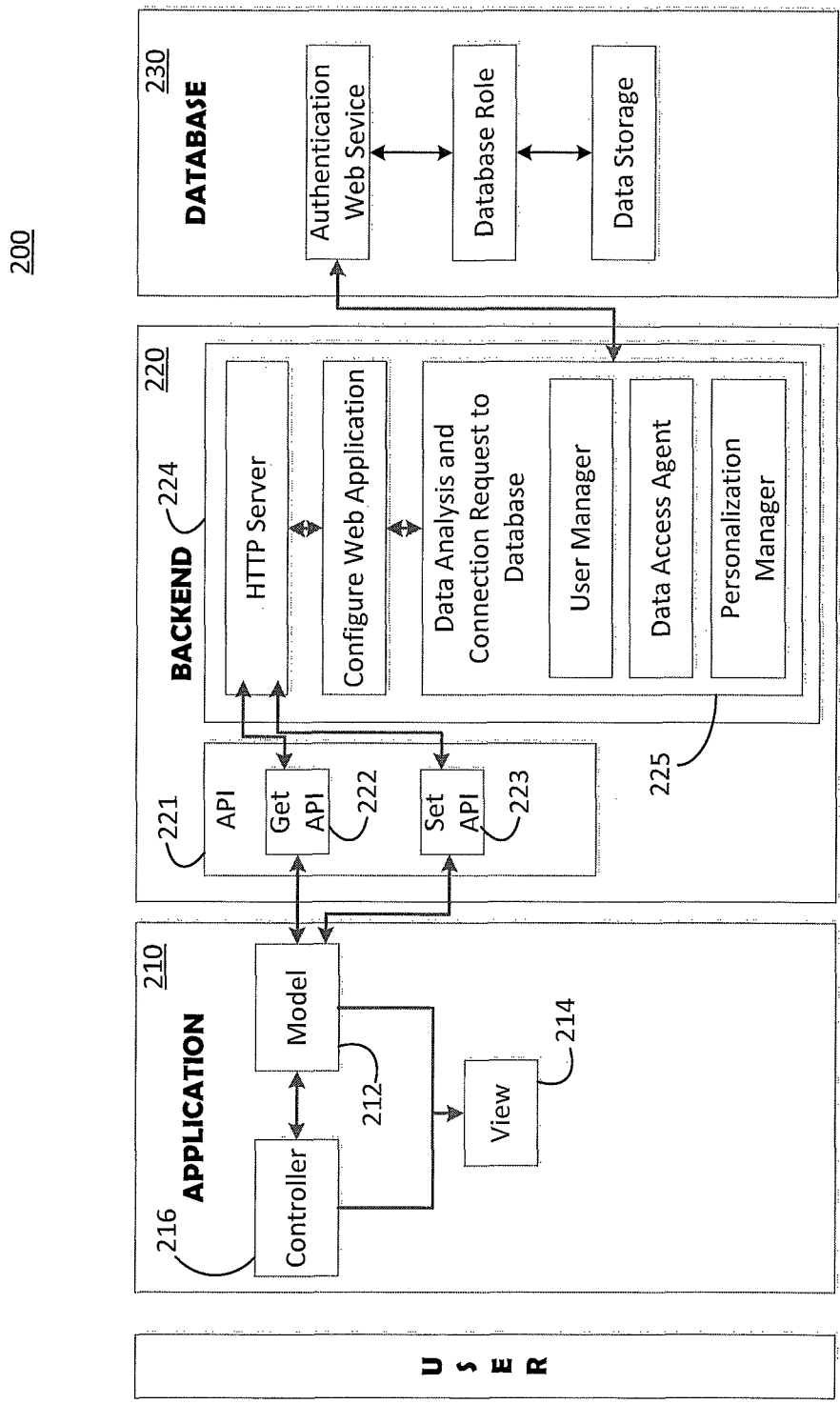
FIG. 2 shows an exemplary functional architecture for implementing a contact management system for managing and updating the contact information of a plurality of users.

An exemplary functional architecture 200 for a contact management server 120 is shown in FIG. 2. The architecture 200 may include application level functionality 210, back-end server functionality 220, and database functionality 230. The application level functionality 210 may provide a user interface on user client systems 110a, 110b, and 110n. In operation, the architecture may provide a framework that allows a user to create an account and manage their own contact information, establish relationships with existing users to enable sharing of contact information between users (updating contacts), generate non-updating contact information for contacts that are not existing users of the system 200, and manage a variety of personal preferences and other options.

In one embodiment, application level functionality 210 is implemented using a Model-View-Controller architectural pattern comprising a model layer 212, a view layer 214 and a controller layer 216. Other architectural patterns may be used. The model layer 212 may be responsible for implementing business logic as well as database implementation. In one embodiment, the model layer 212 handles all communication between the application level functionality 210 and the back-end server functionality 220 by calling various functions via an Application Programming Interface (API) 221. For example, API 221 may include "get" functions 222 and "set" 223 functions described in more detail below. Alternatively, communication between the application level functionality 210 and the back-end server functionality 220 may be managed, in whole or in part, by the view layer 214 and/or the controller layer 216.

The view layer 214 may be responsible for providing the user interface, or presentation layer of the application. In one embodiment, all screens of the user interface are provided by the view layer 214. The controller layer 216 may facilitate communication between the view layer 214 and the model layer 212. In other words, the controller layer 216 may be thought of as a request processing layer.

Back-end server functionality 220 may provide functions and control mechanisms for implementing the contact management server 120. In one embodiment, back-end server functionality 220 includes an API 221 for interfacing with the application level functionality 210, a hyper-text transfer protocol (HTTP) server 224, and data analysis and database management module 225. In one embodiment, API 221 may include functions for retrieving information from the database 130, referred to herein as "get" APIs 222, and functions for providing information for storage in the database 130, referred to herein as "set" APIs 223. In either case, an API request is transmitted to the server, which takes a corresponding action and sends the response to the application. If appropriate, the user may be provided with information from the response.

In one embodiment, APIs 221 may include a Login API for allowing a user to log into the application on the user client system 110a, 110b, and 110n, a Signup API for enabling a user to establish an account with the contact management system 100, a Verification API for confirming the identity of a user, a ResendCode API for providing an alternate method to confirm the identity of a user, a Signuptbl API for saving user information during the signup process, a FetchContacts API for retrieving contacts associated with a specified user, a FavContact API for designating a contact a favorite, a FavOrder API for establishing a priority of favorite contacts for display purposes, a GetContact API for retrieving contact details for a specific user, a GretelCard API for viewing specific user contact information, a SaveGretelCard API for updating user contact information, a GretelMe API for sending an invitation to connect to another user, a DeleteContact API for deleting an existing contact, an InviteGretel API for determining the status of an invitation, an AddGroup API for creating a group of existing contacts, a GetGroupList API for viewing a list of existing groups, a ViewGroup API for viewing details for an existing group, a DeleteGroup API for deleting a group, a RecieveInvitation API for retrieving pending invitations, a Notification API for receiving messages sent by an administrator to users, an AfterNotification API for specifying a timeframe for receiving notifications of pending invitations and/or saving the setting of the user, a CSVExport API for exporting a file including a user's contacts' information, and a SendStatus API for sending a status indicator regarding whether the user has imported contacts from a legacy contact management system. Exemplary XML definitions for these APIs are provided in Appendix B. Other functions may be implemented by API 221.

The HTTP server 224 may be an Apache HTTP Server (provided by the Apache Software Foundation), or any other suitable HTTP server. Other communications servers may be used. In operation, HTTP server 224 receives requests (such as API calls) from user clients 110a, 110b, and 110n, processes the requests and takes appropriate actions in conjunction with Data analysis and database management module 225, and provides responses to the user clients 110a, 110b, and 110n.

Data analysis and database management module 225 may interface with the database 130 to retrieve and/or store information. In one embodiment, data analysis and database management module 225 may provide functionality for managing user information, contact information, relationship data for connecting registered users and other personalization data, and for searching a directory. Other functions may also be provided.

Figure 3:
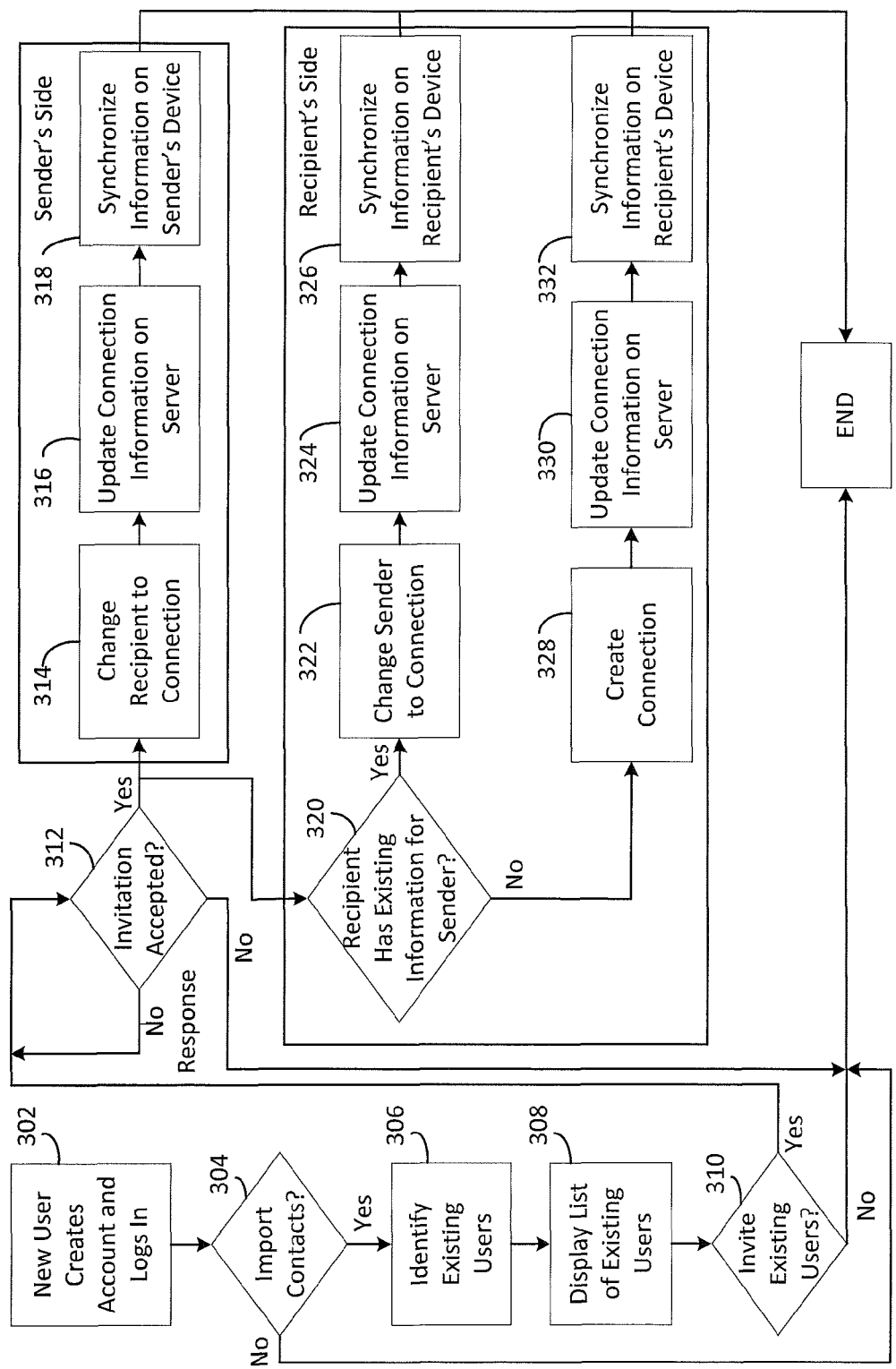
FIG. 3 shows an exemplary flowchart for a user registration process that includes a process for inviting users to connect with the registered users for one embodiment of a contact management system.
Figure 6:
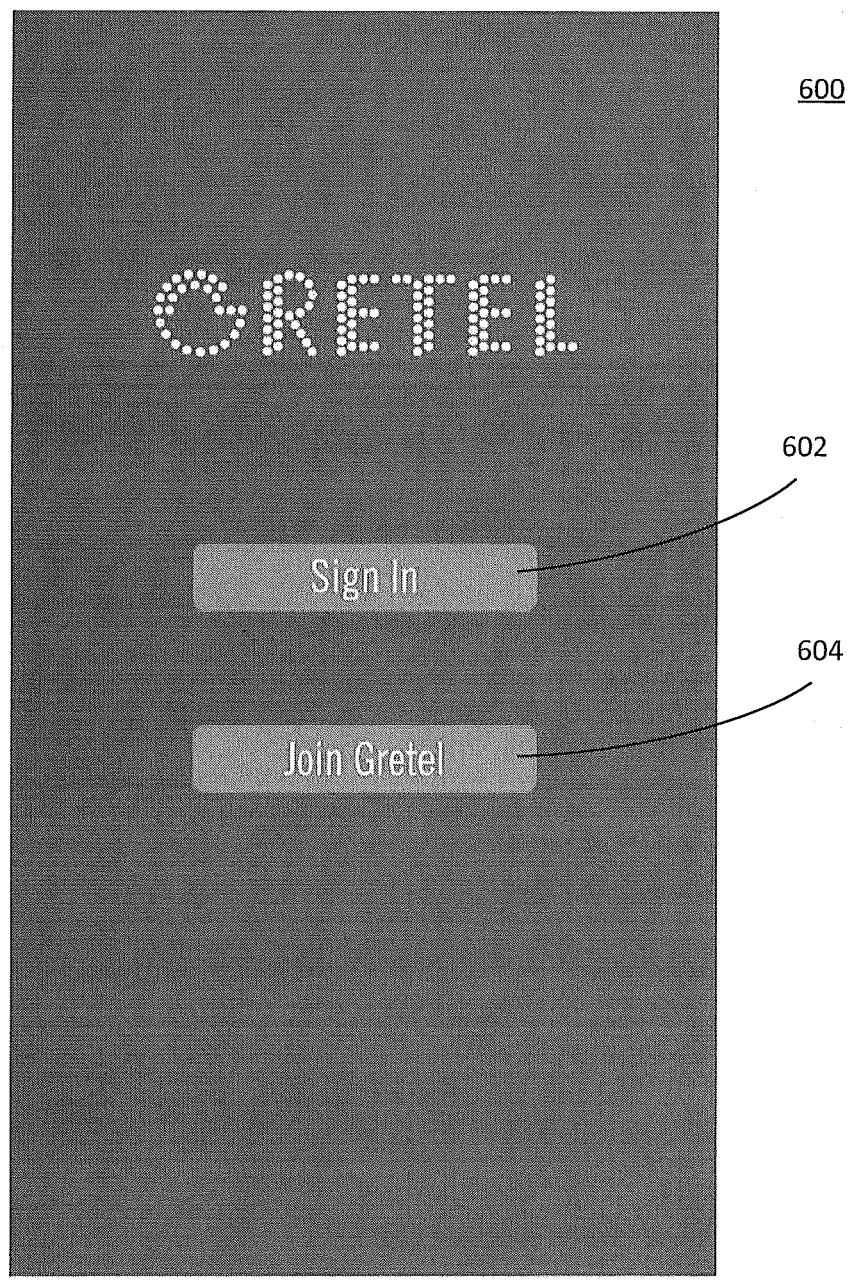
FIGS. 6-36 show exemplary screen shots for embodiments of a user interface for a contact management system.

A flow chart 300 depicting a user registration process that includes a process for inviting users to connect with the registered users for one embodiment of a contact management system is shown in FIG. 3. In the illustrated example, a user may create an account and log in to a client application for a contact management system 100 at step 302. In one embodiment, upon opening a client application, a user may be presented with a landing screen (such as the landing screen 600 shown in FIG. 6) that allows a user to log in or create an account by selecting appropriate interface controls 602 and 604, respectively.

Figure 8:
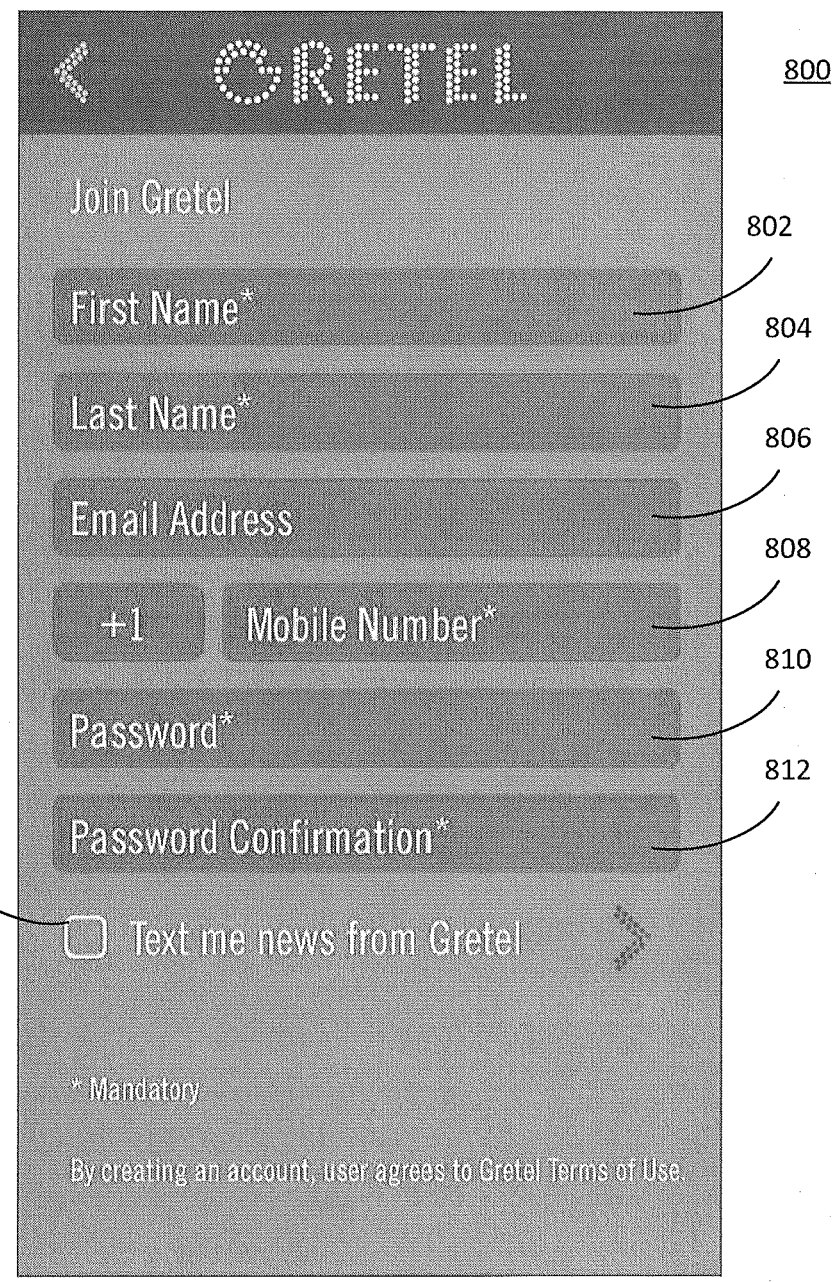
Figure 9:
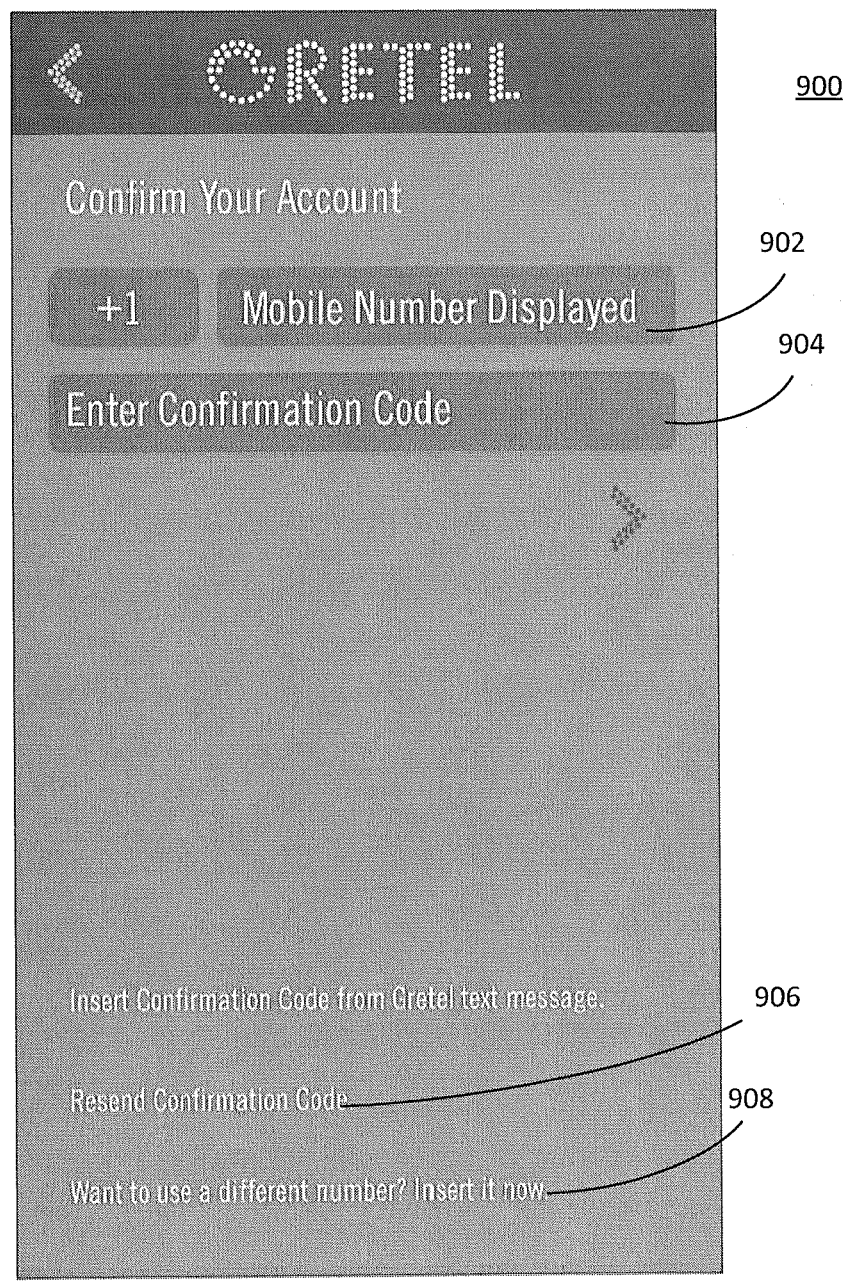

Upon selection of the account creation control 604, the user may be presented with an account creation screen such as the account creation screen shown in FIG. 8. The account creation screen may include interface controls for allowing a user to provide a first name 802, last name 804, email address 806, mobile phone number 808 (including country code, if applicable), password 810, and password confirmation 812. Optionally, the user may indicate a preference for receiving text messages from the contact management system 100 via corresponding interface controls 814. In response to a user submission of account information, the contact management system 100 may verify the identity of the new user, such as by providing a text message including a confirmation code. As shown in FIG. 9, the user may enter a confirmation code in an appropriate interface control 904 and submit the code to confirm the identity of the user. Optionally, the user may request a duplicate code or modify the mobile phone number associated with the account by selecting respective interface controls 906 and 908. Other verification methods may be used.

Figure 10:
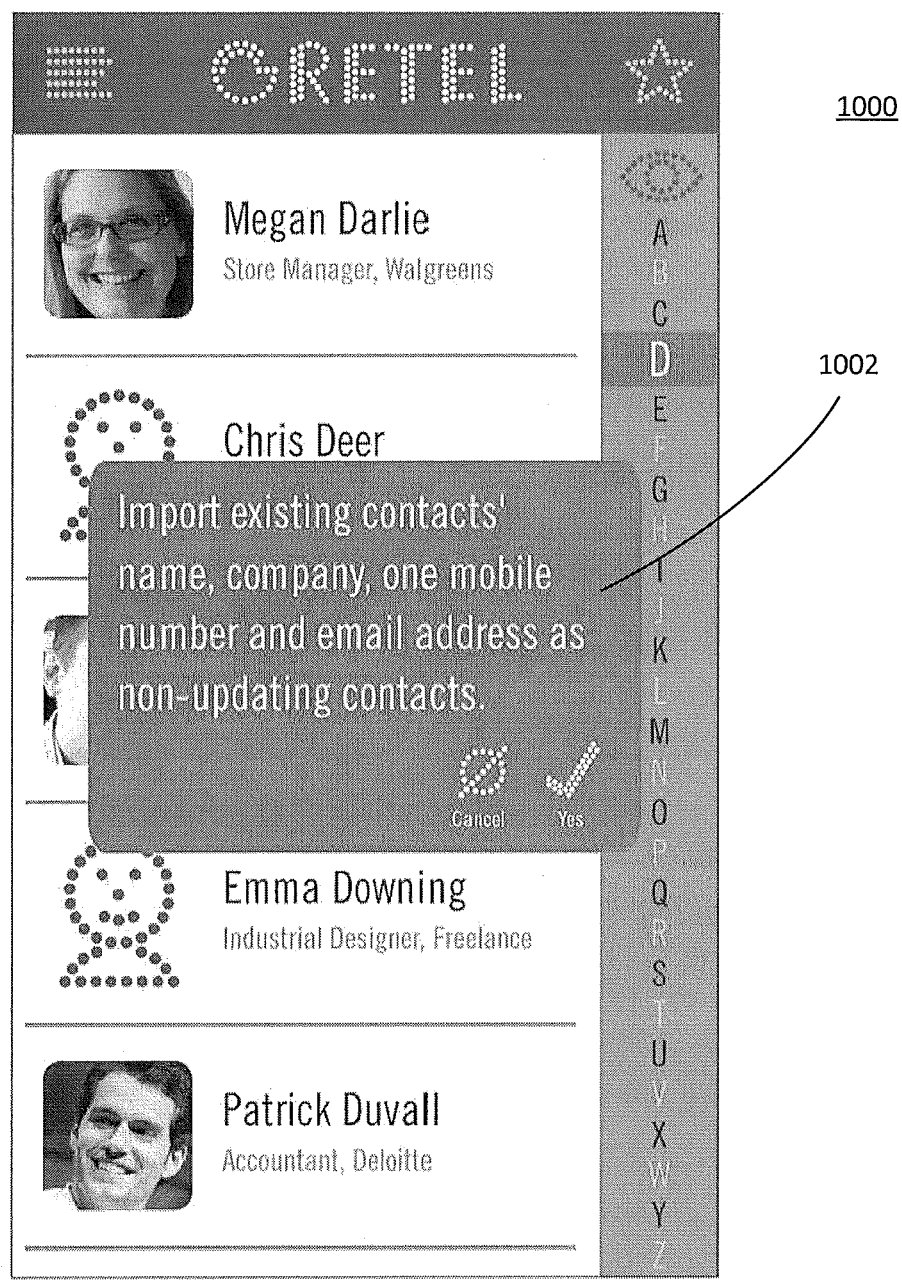

Returning to FIG. 3, a new user may be presented with an option to import existing contacts stored on a legacy contact management system at step 304. For example, a pop-up window 1002 including appropriate interface controls may provide a mechanism for allowing a user to import legacy contacts (FIG. 10). If the user initiations the importation process, contact information stored in a legacy contact management system may be imported in the system at step 304. In one embodiment, a single piece of information per type (i.e. one phone number, one email address, etc.) may be imported. Alternatively, more or less information may be imported at step 304. Other methods, such as manual entry by the user, may be used to input contact information for a user's contacts into the system.

Figure 11:
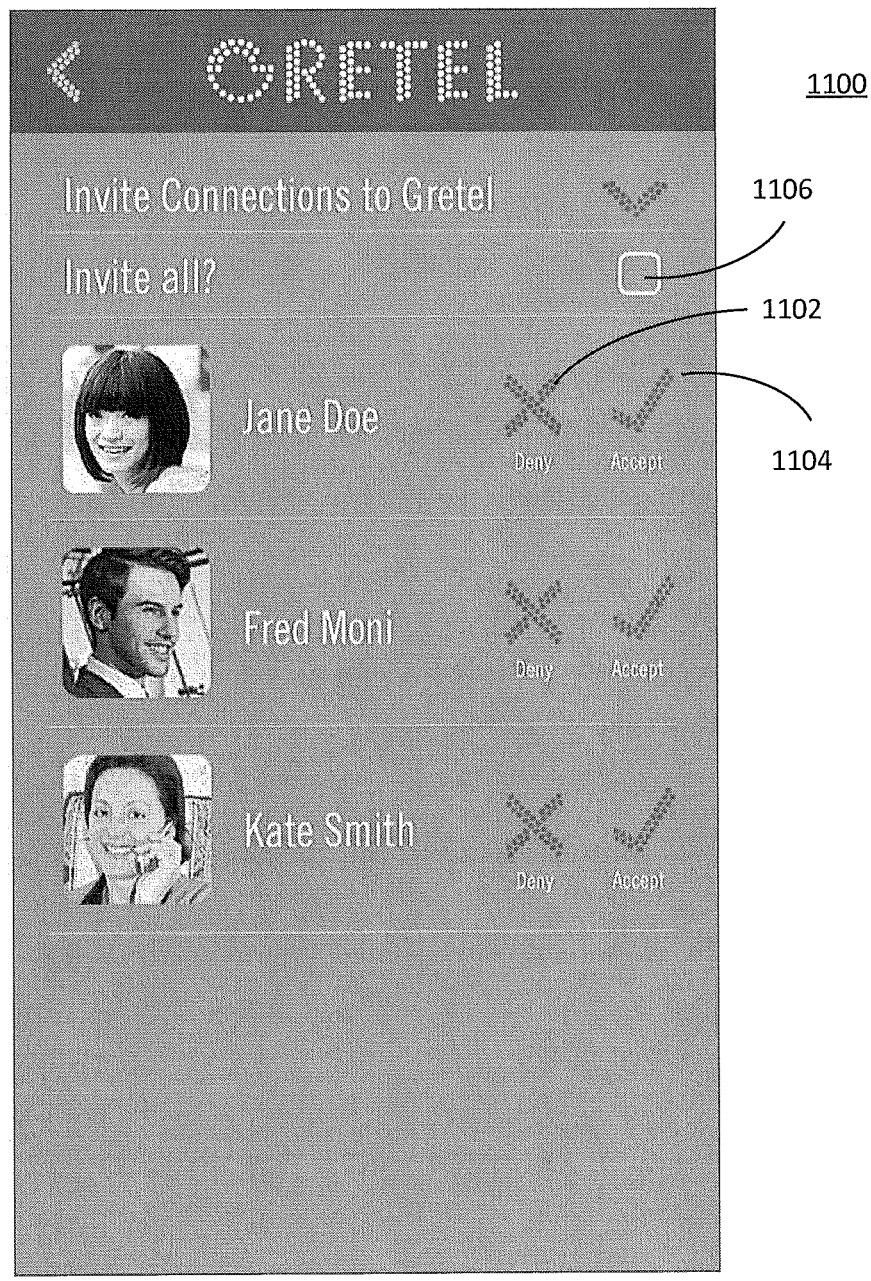

Next, the system may analyze the mobile phone numbers to determine if any imported contacts correspond to existing registered users of the system at step 306 for example, by determining if an registered users have a matching phone number and/or name. If so, a list of existing registered users are displayed at step 308. An exemplary list of existing users is shown in FIG. 11. The user may choose to invite any or all listed users to establish a contact information sharing relationship at step 310 (such as by selecting corresponding interface controls 1102, 1104, and 1106).

Figure 24:
Figure 25:
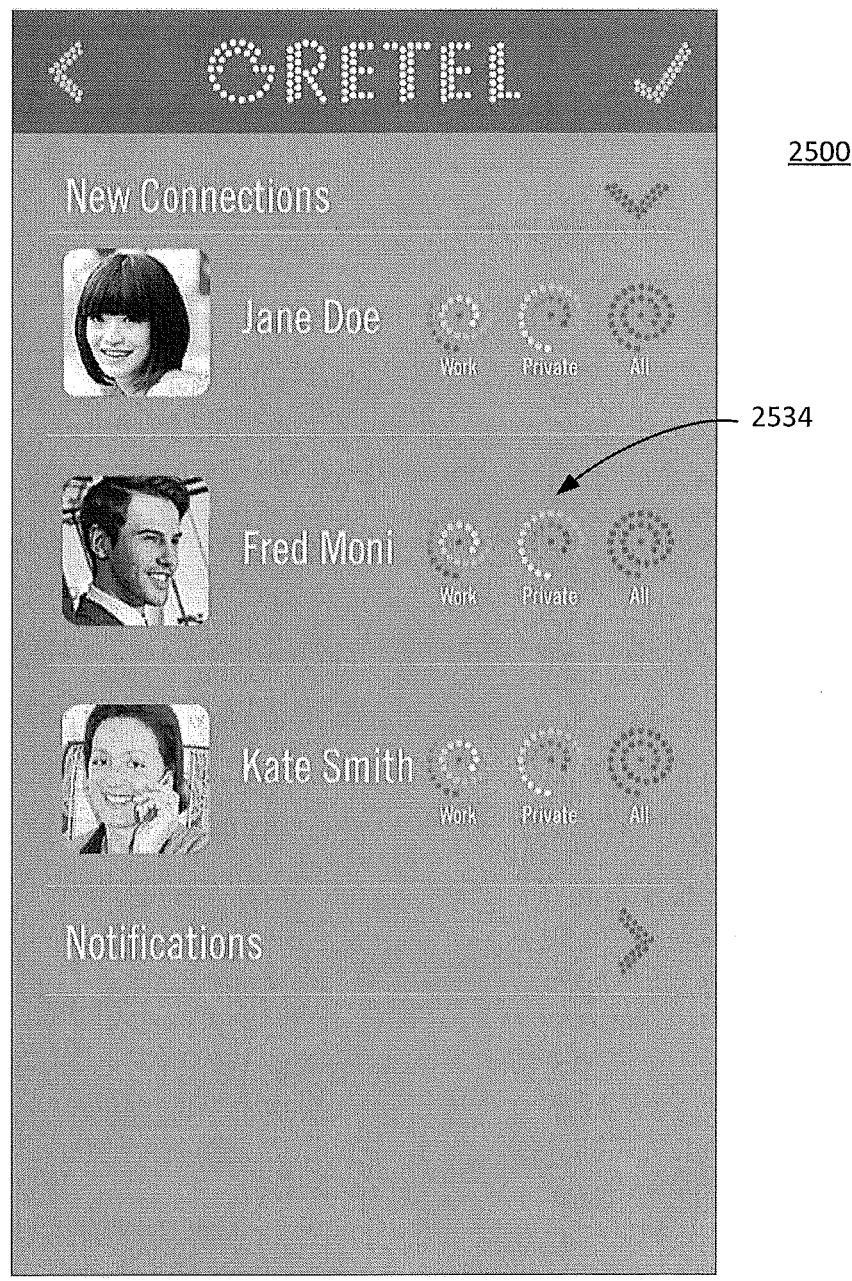

Once invitations are sent to existing users, the system may determine if the invitation has been accepted, denied, or if no response has been received at step 312. An exemplary screen shot showing a list of pending invitations is shown in FIG. 24. The invited user may accept or deny the invitation by selecting corresponding controls 2402 or 2404, respectively. If no response has been received after a specified time period, the system may wait further for a response. Alternatively, or additionally, reminders may be sent to an invited user, as described in more detail below. If a user accepts an invitation, the invited user may specify sharable contact information. For example, FIG. 25 shows a screen shot that allows a user to specify whether the user wishes to share work information, private information, or both types. Alternatively, or additionally, contact information may be segmented into more or less information types, or pieces of information may be shared individually.

If an invitation is accepted, several actions may take place. On the sender's side (the inviting user), the contact is changed to an updating connection at step 314, the connection is uploaded to the back-end system 120 at step 316, and the contact information stored for that user in the database is synchronized on the sender's device at step 318. On the receiver's side (the invited user), the system first determines if the recipient already has contact information (non-updating) for the inviting user at step 320. If so, the connection is changed to an updating connection at step 322, the connection is uploaded to the back-end system 120 at step 324, and the contact information stored for the inviting user in the database is synchronized on the recipient's device at step 326. If the inviting user does not have existing contact information for the sender, an information sharing relationship is created at step 328, the connection is uploaded to the back-end system 120 at step 330, and the contact information stored for the inviting user in the database is synchronized on the recipient's device at step 332.

Figure 4:
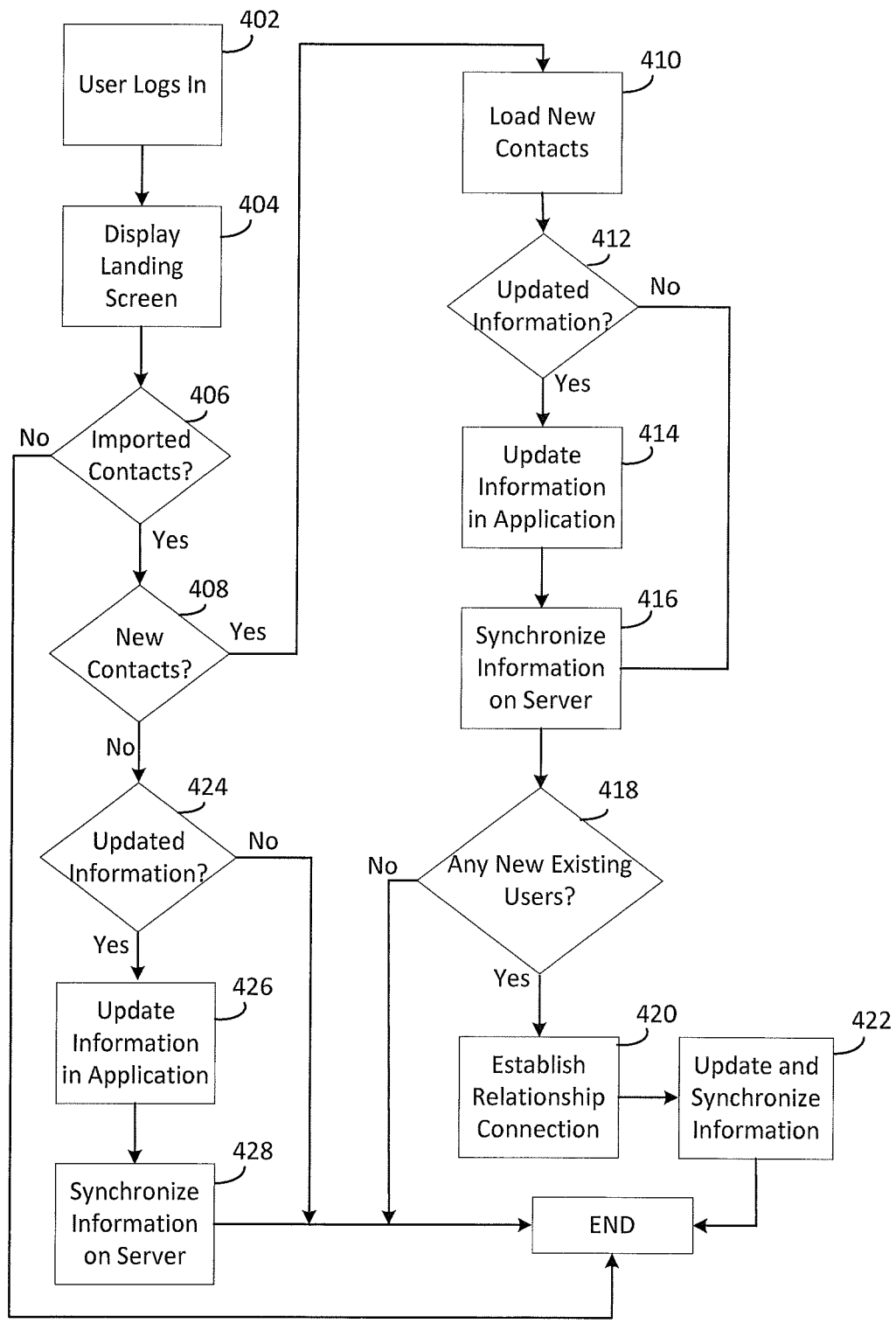
FIG. 4 shows an exemplary flowchart for a general updating process for one embodiment of a contact management system.
Figure 7:
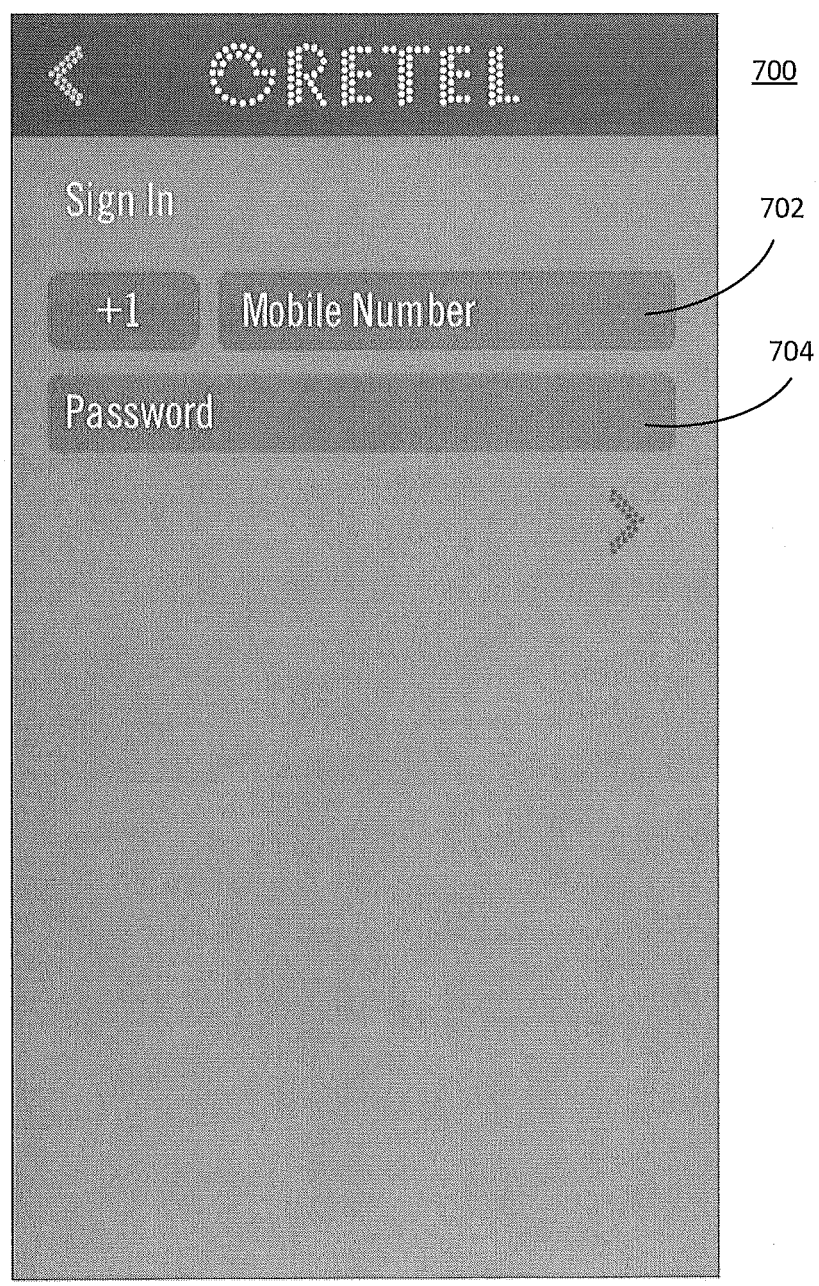

FIG. 4 shows an exemplary flowchart for a general working of one embodiment of a contact management system. An existing user may log in to the system at step 402. For example, upon selection of the login control 602 (FIG. 6), a user may enter a mobile phone number and password using appropriate interface controls 702 and 704 as shown in FIG. 7. In one embodiment, a user is required to login in order to access the contact information stored on the mobile device to enhance the privacy of the information. Alternatively, or additionally, access to the information may be disabled remotely by the system 200 using a variety of known and/or future techniques.

Upon logging in, the user may be taken to a landing screen, such as the landing screen 1000 shown in FIG. 10, and asked if they would like to import any additional contacts from a legacy contact management system at step 404. If the user has previously imported contacts (step 406), the system determines if there are any new contacts being imported during the current operation at step 408. If so, the system loads the new contacts at step 410. The system then determines if any contact information has changed for existing updating connections for the user at step 412. If so, the system updates the information in the application at step 414 and the updated information is synchronized to the back-end server 120 at step 416. Next, the system determines if any newly imported contacts are existing users of the system at step 418. If so, the system may establish the contact sharing relationship between the users at step 420 and update and synchronize the users' contact information at step 422. These steps may be performed, for example, by using a process similar to the one described above in reference to FIG. 3. Alternatively, if there are no new contacts found during the importation process, the system may determine if any contact information has changed for existing updating connections for the user at step 424 and, if so, update the information in the application at step 426 and the updated information is synchronized to the back-end server 120 at step 428.

Figure 5:
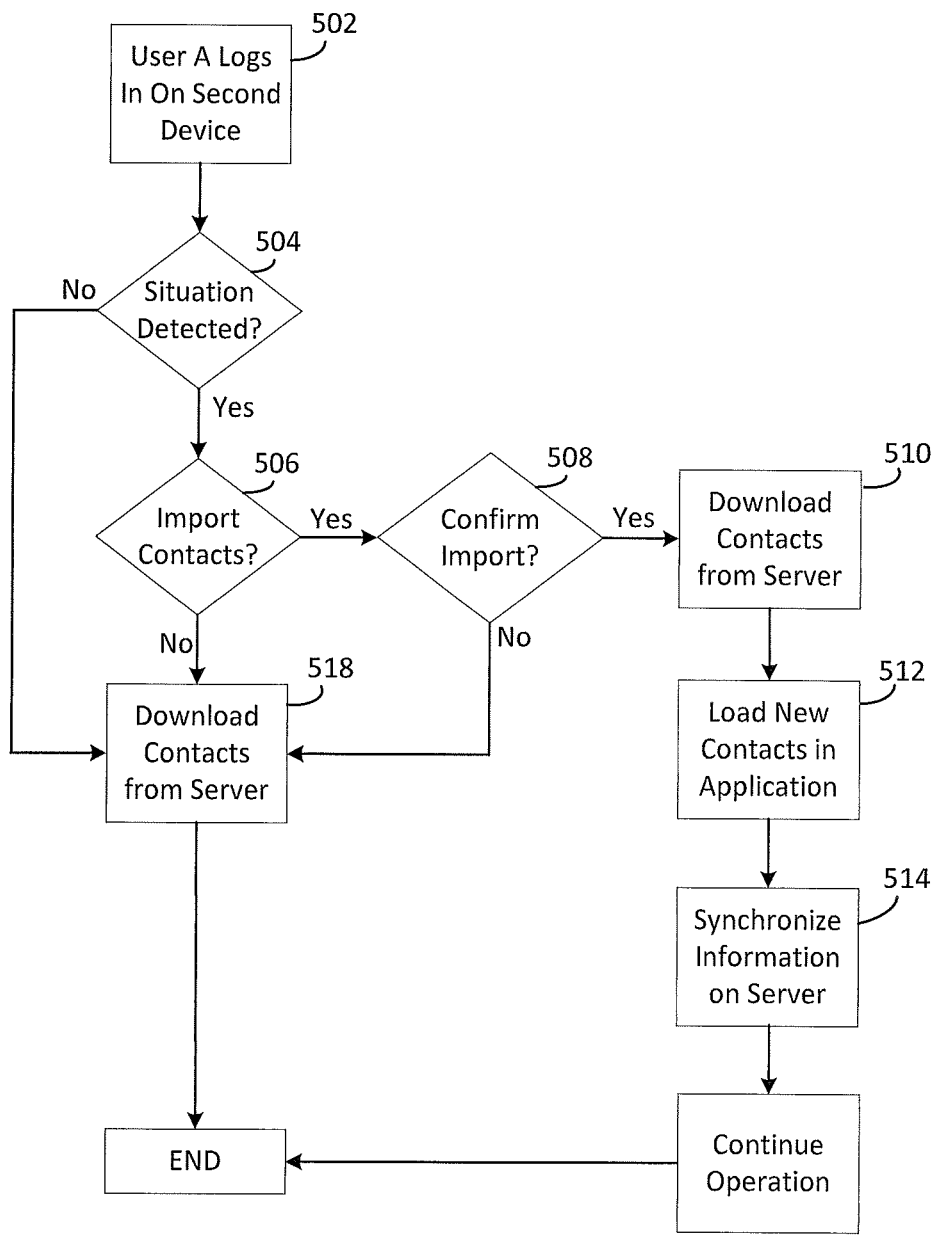
FIG. 5 shows an exemplary flowchart for one embodiment of a contact management system that allows a first user to log in and utilize a contact management application running on a second user's mobile device.

FIG. 5 shows an exemplary flowchart for one embodiment of a contact management system that allows a first user to log in and utilize a contact management application running on a second device. The second device may be another device of the first user (User A), or may belong to another user of the system (User B) A first user (User A) may log into the system using an application on a second device at step 502 and the system detects this situation at step 504, for example, by analyzing a log file. Next, the system may ask User A if they wish to import existing contacts from a legacy contact management system on second device at step 506. If not, the system may download User A's existing contacts from the back-end server 120 at step 518. Optionally, the system also may disable the ability to access and/or update contact information on this device in the future without a successful log in at step 518. If User A does wish to import contacts from User B's device, the system may confirm this desire at step 508 and, if confirmed, download User A's contacts from the cloud at step 510. Next, the system may load any new contacts from the legacy contact management system into the application at step 512, synchronize all imported contacts to the back-end server 120 and then continue operation in a similar manner to FIG. 4 (starting at step 408). Alternatively, or additionally, the system may not allow a user to log into the system from a second device or limit the number of devices from which a user may log into the system. Other variations may also be used.

Figure 12:
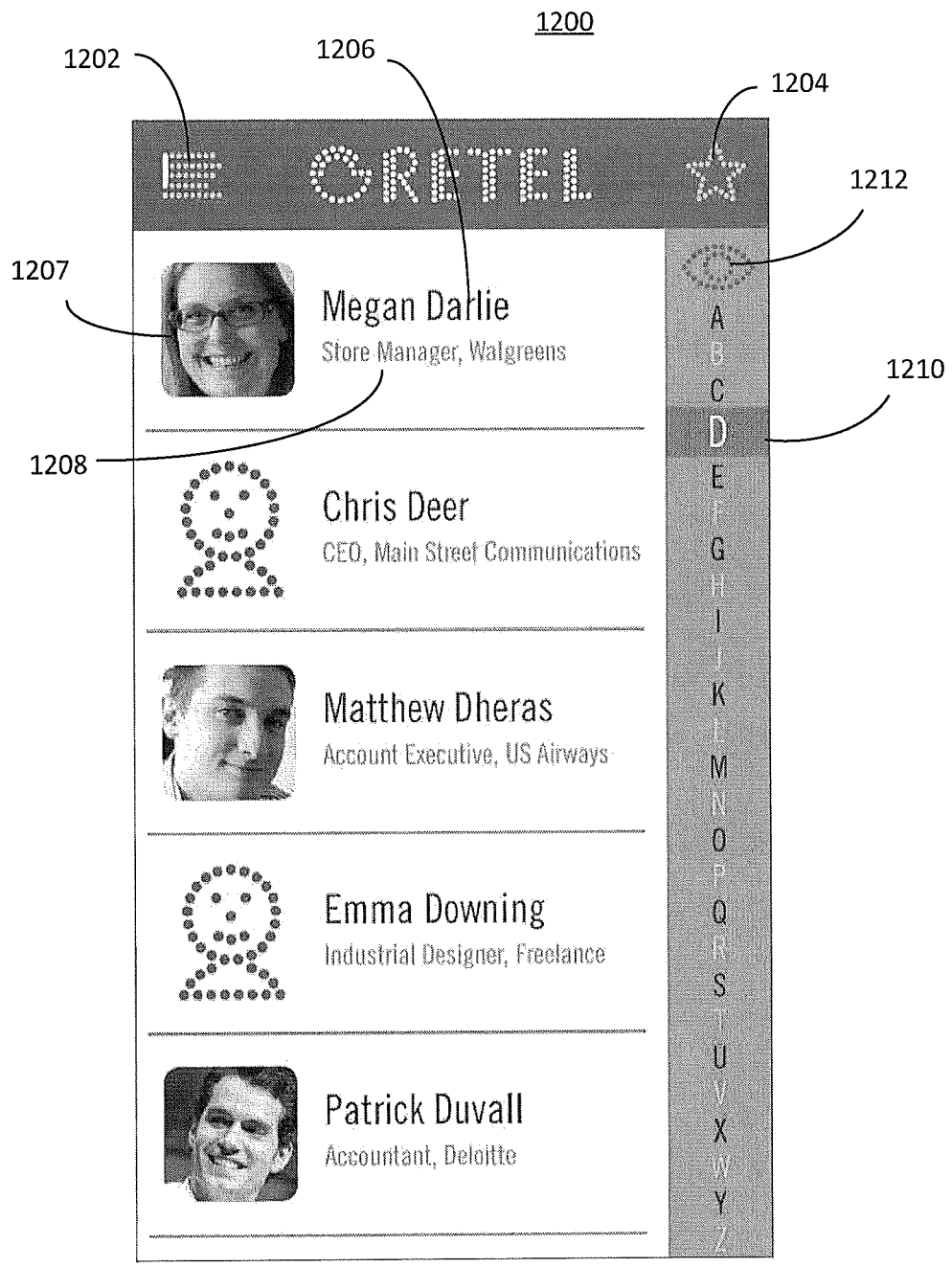
Figure 20:
Figure 21:
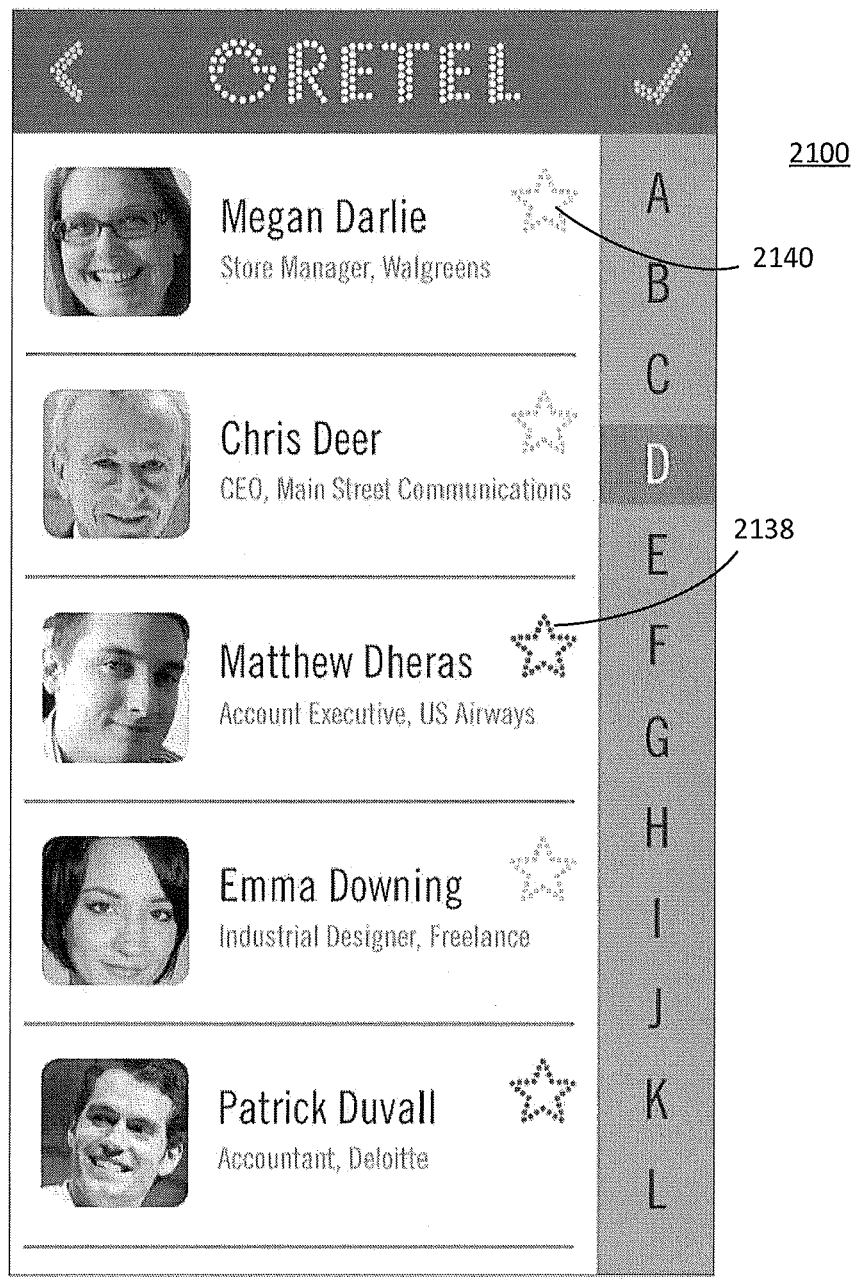
Figure 22:
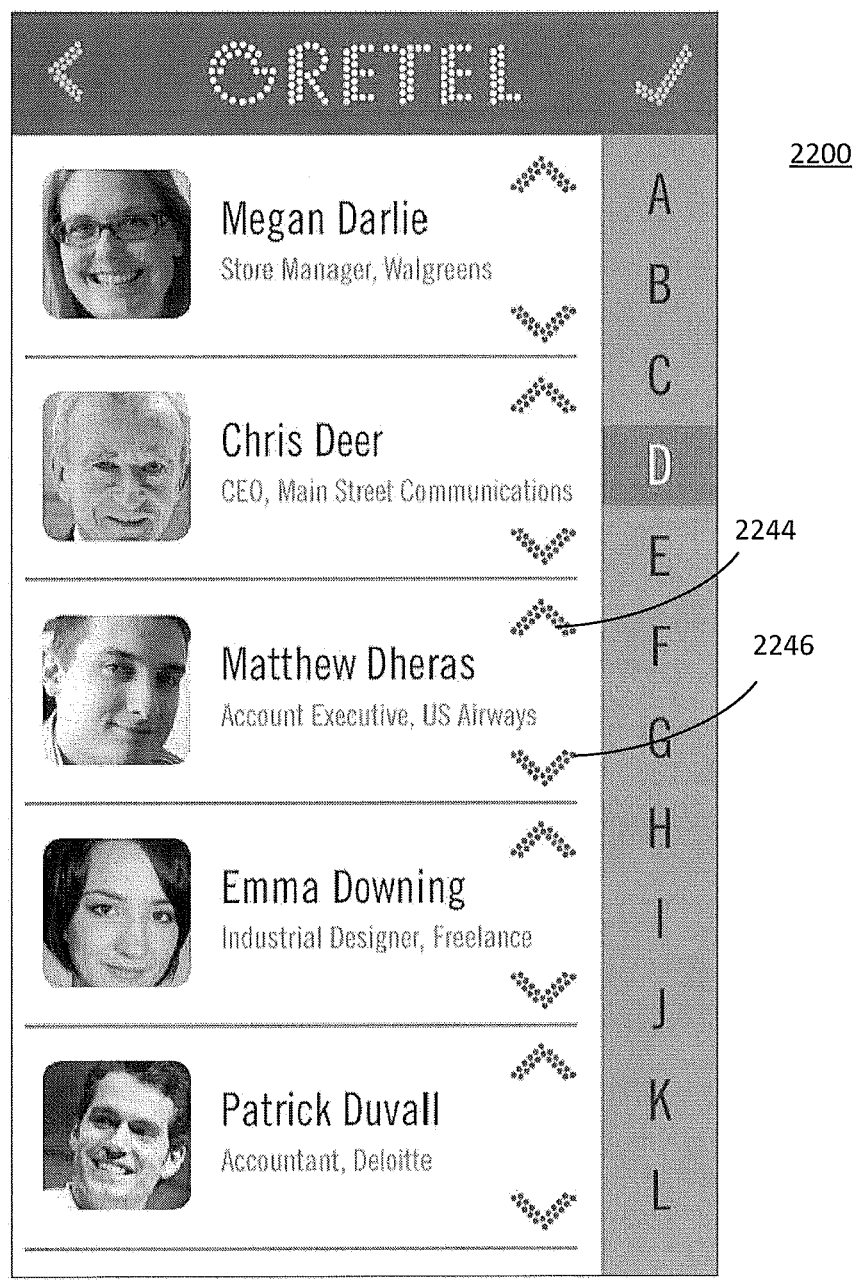

Additional capabilities of various embodiments of the system 200 are now described with respect to the various screen shots shown in FIGS. 11-40. FIG. 12 shows a screen shot 1200 of an exemplary landing screen 1100. The landing screen 1200 may include a list of contacts. Each contact listing may include a name 1204, a picture 1206 (if available), and job related information 1208. More or less information may be included for listed contact. Controls may be provided to allow a user to select a menu (1202) and/or a list of favorite contacts (1203). For example, selection of a favorite contacts control (1203) may cause a list of pre-selected favorite contacts (indicated with star 2038) to be displayed, as shown in FIG. 20. Selection of an edit button 2007 may allow the user to select a favorite (shown with bold star 2038) or deselect a favorite (shown with a grey-out star 2040) as shown in FIG. 21. The user may confirm their designations by selecting the appropriate control 2142, after which the user may reorder the favorite list via controls 2244 and 2246 as shown in FIG. 22. Navigation controls may also be provided to allow a user to navigate to contacts jump up or down the list by selecting a letter (1110) or search for an existing contact (1112) by entering a keyword (1802 in FIG. 18).

Figure 13:
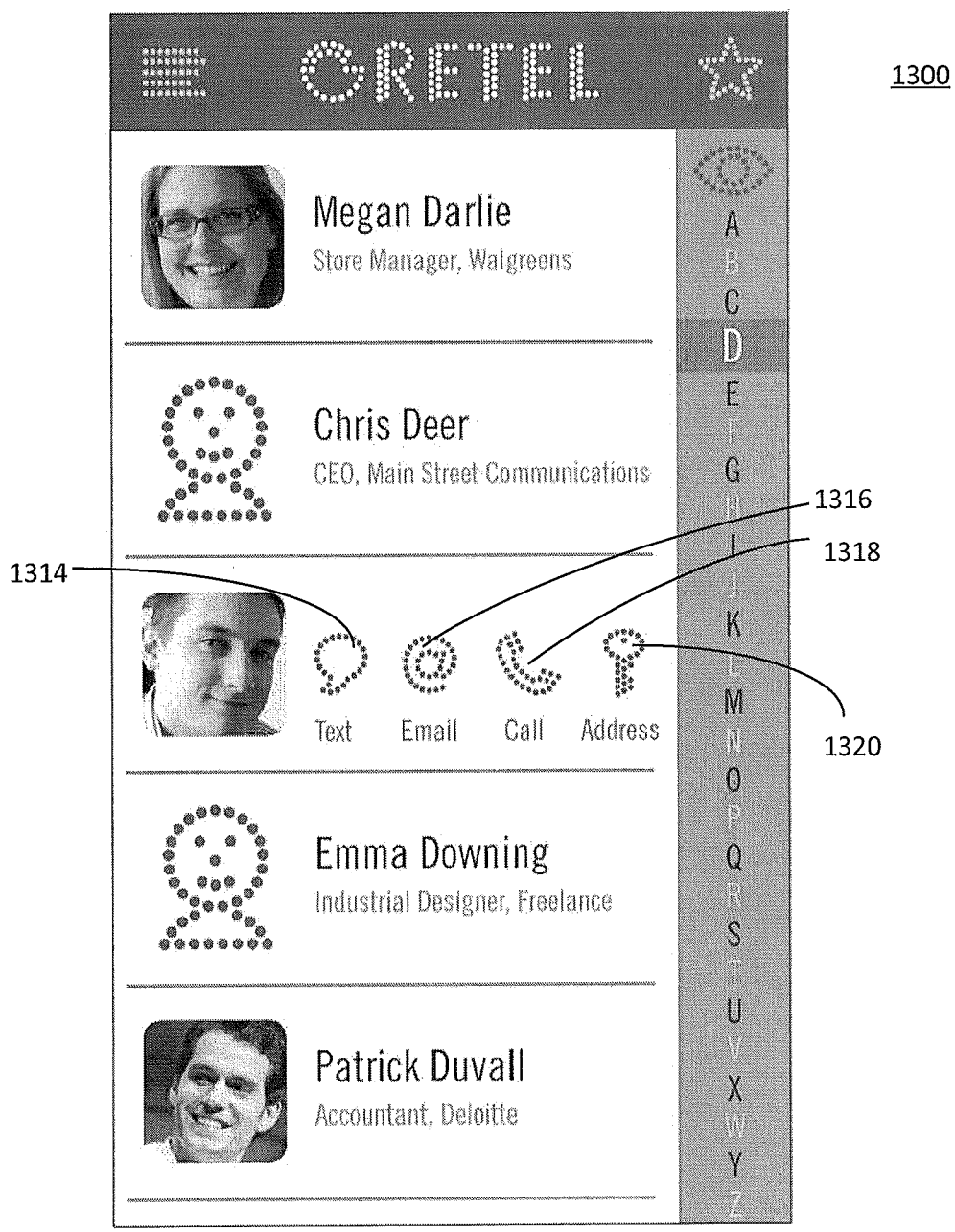

Upon selection of a listed contact, controls for selecting among one or more communication options may be provided. For example, FIG. 13 shows controls for communicating with a contact via text message (1314), email (1316), or phone (1318). Selection of these controls may launch legacy communication applications corresponding to the selected control. The legacy application may be hardware specific (e.g. the native phone application on a cell phone for placing a telephone call) or hardware independent (e.g. Skype, WhatsApp, etc.). Alternatively, or additionally, the system may include built-in applications for communicating with a contact via the selected control. In one embodiment, the contact information associated with each particular control may be based on an inbound communication preference set by the associated updating user. In the illustrated example, user Mathew Dheras may set a mobile phone number as an inbound communications preference for text messages; if so, selecting the text message control 1314 may cause a text messaging application to launch for composing a text message to the specified mobile phone number. In the case of a non-updating user, the contact information associated with each control may be the single piece of contact information stored for that user that is compatible with the selected control (e.g. the only email address for the contact). Alternatively, or additionally, the user may be able to select a default number or email address for one or more controls for any non-updating contacts. Other methods of associating contact information with the controls may also be used.

Figure 14:
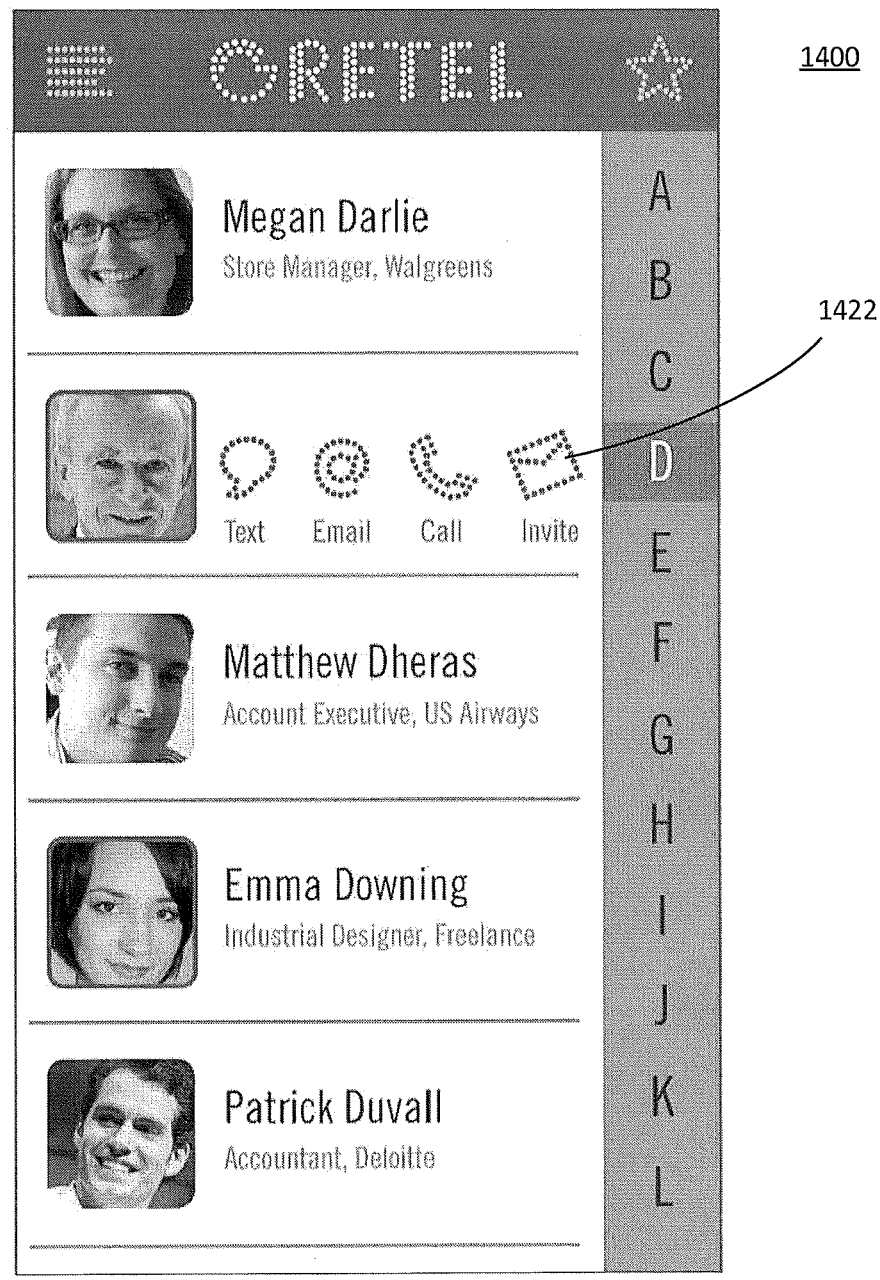
Figure 15:
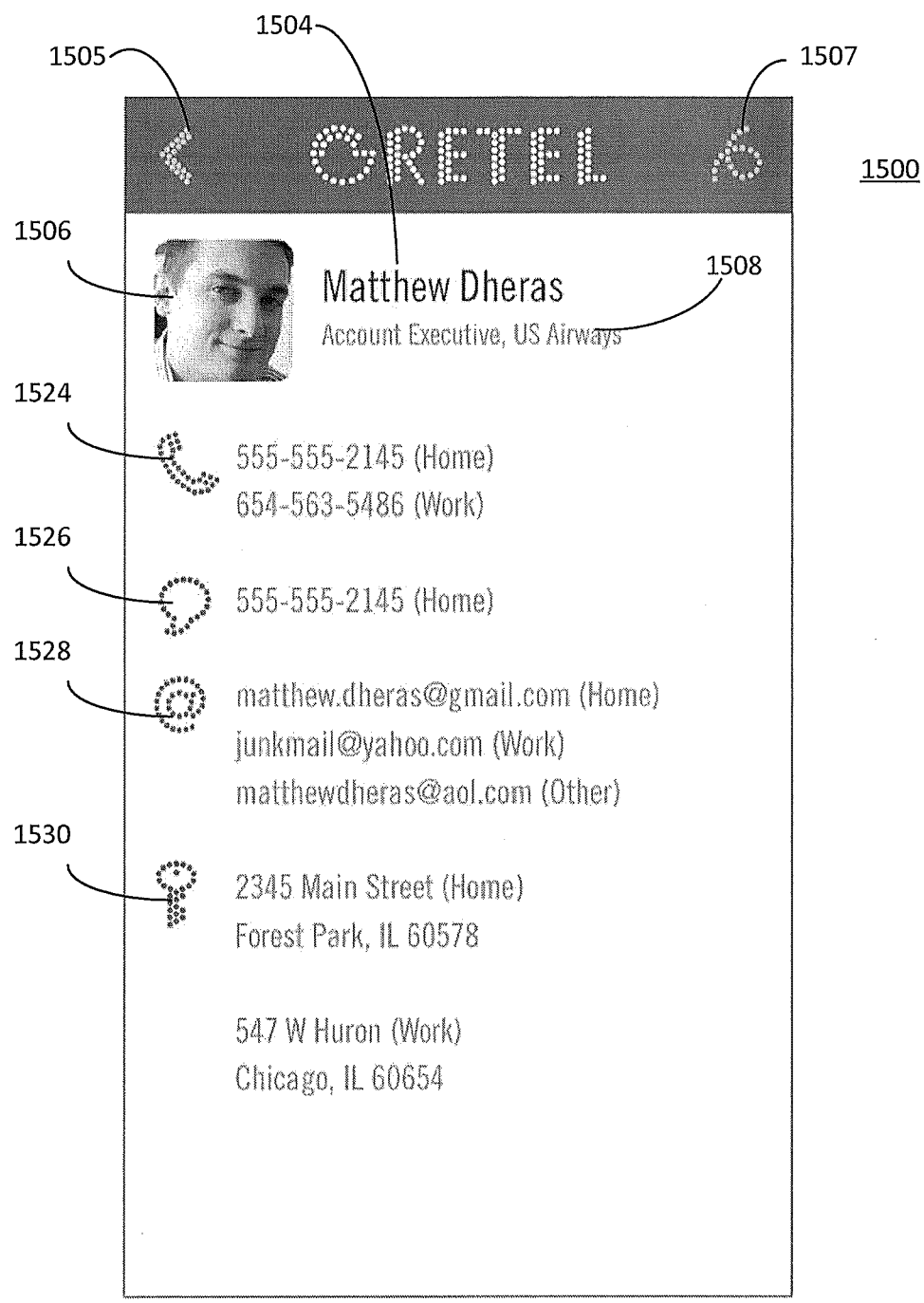
Figure 16:

A control (1220) may also be provided to view a contact card that includes all contact information for a contact, as shown in FIG. 15 which shows two phone numbers (1524), three email addresses (1528), one text message number (1526), and two physical addresses (1530) for a contact. Each of the listed pieces of contact information may be selectable (or associated with a selectable interface control) that causes a legacy or built-in communication application corresponding to the selected information or control to be launched. If the selected contact is a non-updating connection (i.e. no contact information sharing relationship has been established between the user and the contact), a control (1422) for initiating an invitation process may be provided upon selection of a listed contact as shown in FIG. 14, and/or on the non-updating contact's contact card as shown in FIG. 16 (1632).

Figure 17:
Figure 18:
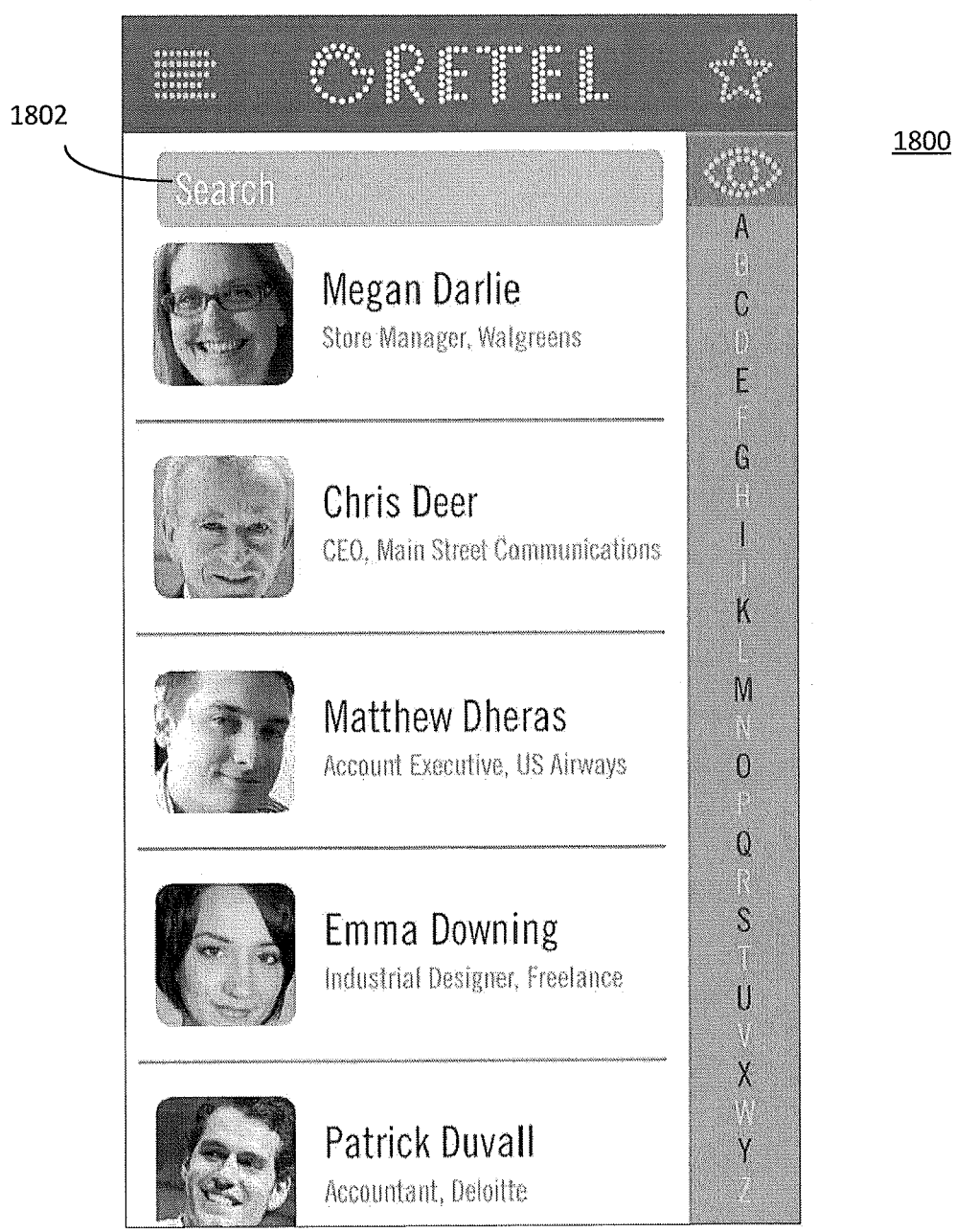
Figure 19:
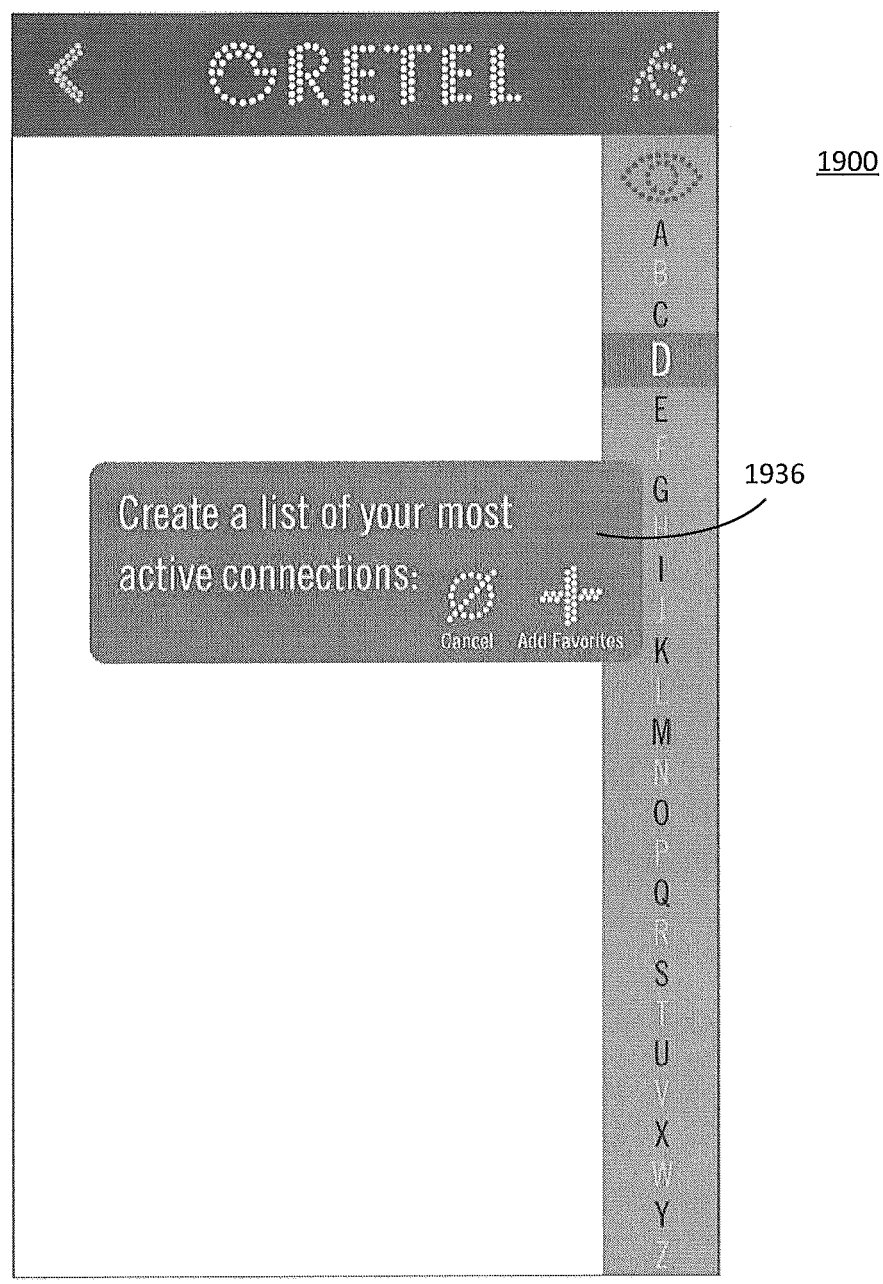

When viewing a specific user's contact card, a control (1507 in FIG. 15) may be provided to allow a user to edit information for a contact. If the selected contact is a non-updating contact, the user may be allowed to freely edit the contact information of the selected contact. If the selected contact is an updating contact, the user may be prompted (1734) to confirm the contact information to be shared with the selected contact, such as work information, private information, or both, as shown in FIG. 17.

Figure 23:
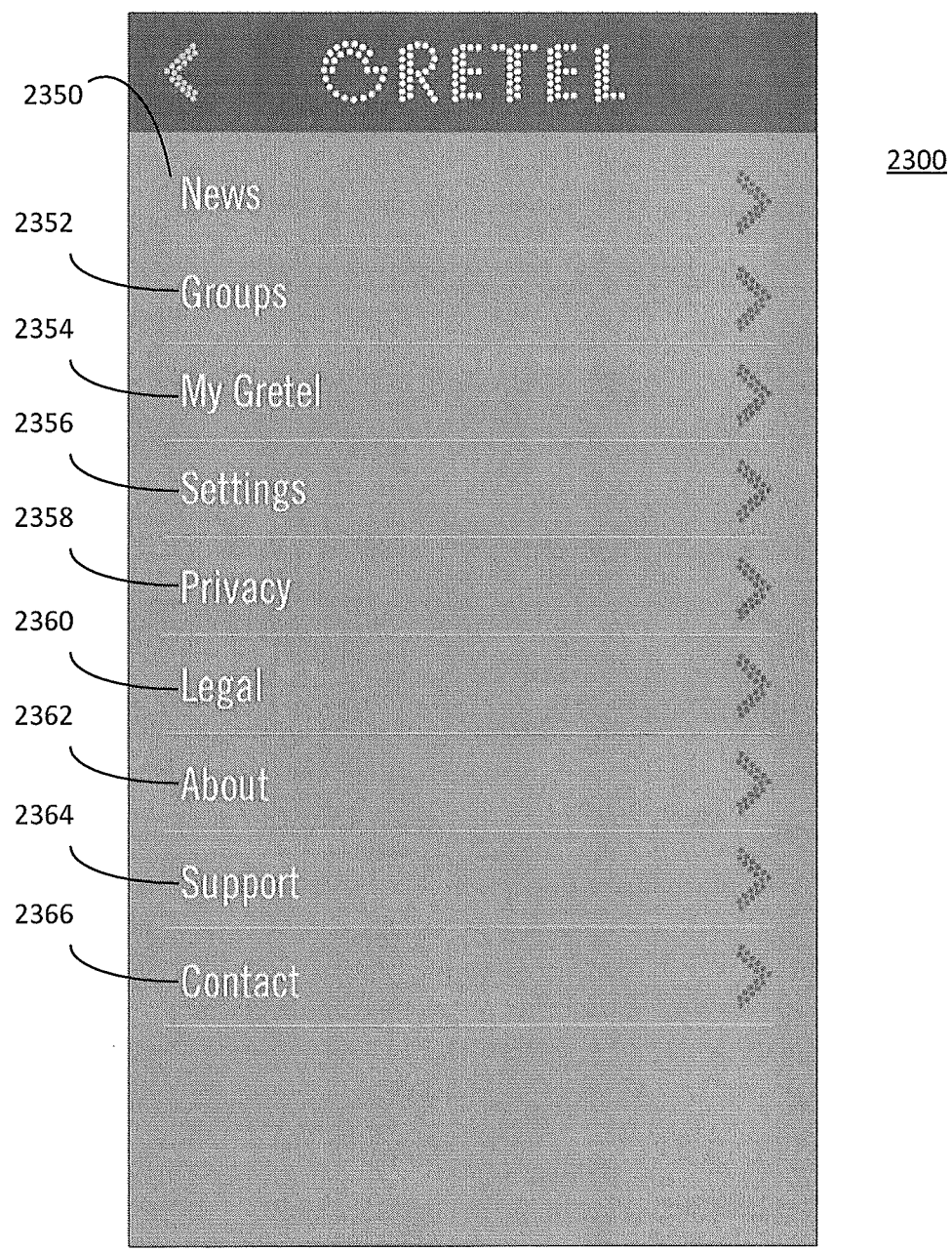

As shown in FIG. 23, an exemplary menu may include options for selecting a list of pending invitations (2350), manage group settings (2352), manage their personal contact information (2354), manage other settings (2356), retrieve information related to a privacy policy (2358), other legal matters (2360), the system generally (2362), or support (2364), and/or contact the developers (2366).

Figure 26:
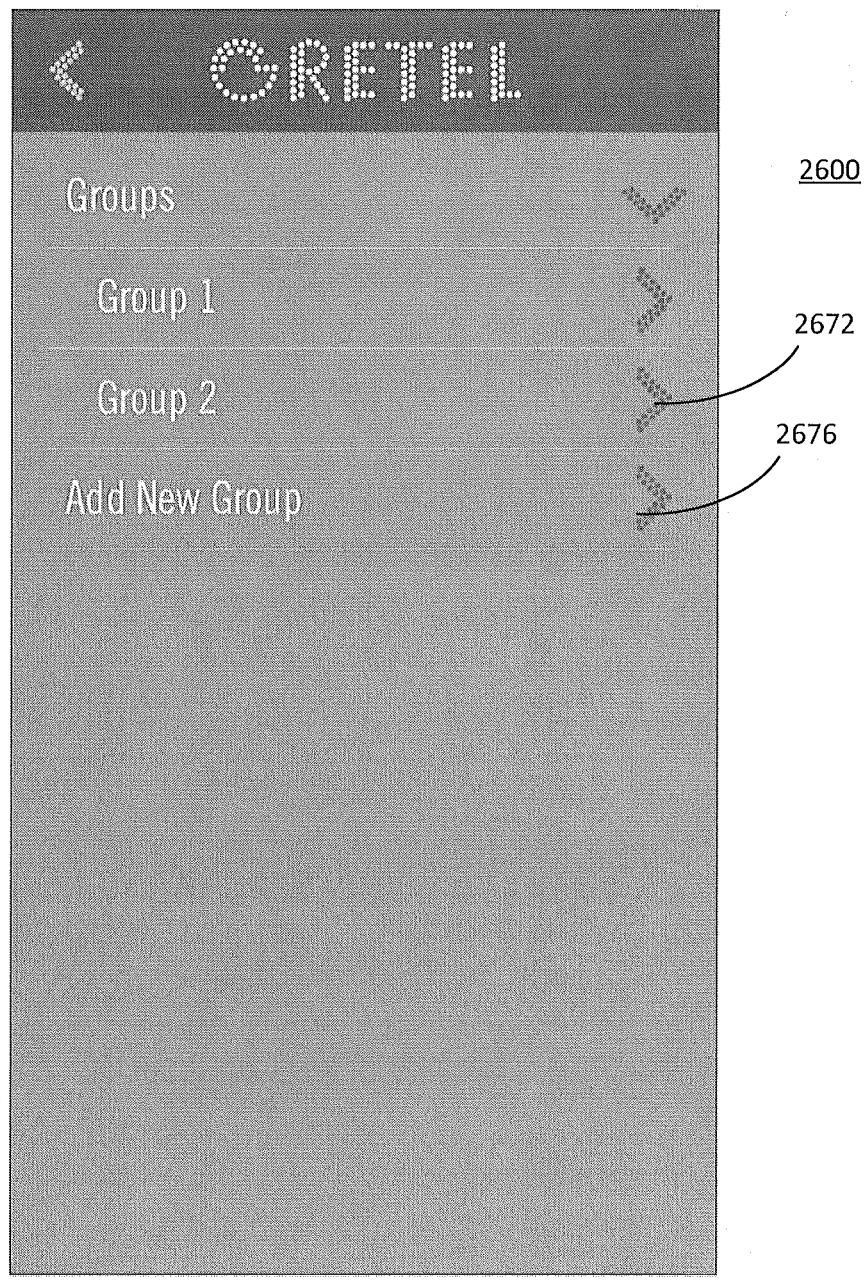
Figure 27:
Figure 28:
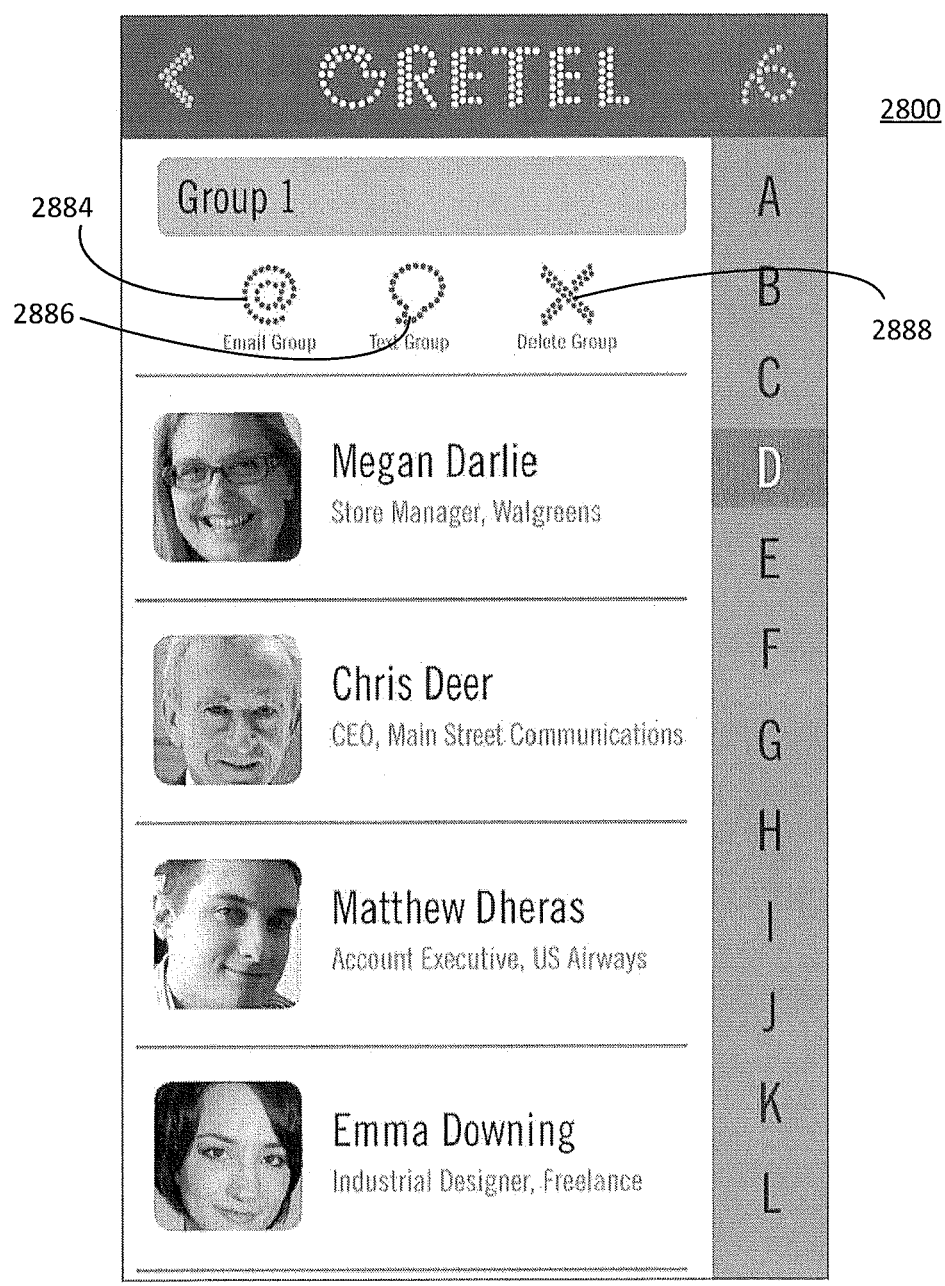

To manage group settings, the user may navigate to the group menu page, such as the group menu page 2600 shown in FIG. 26. The group menu page 2600 may include controls for selecting existing groups (2674) or to add a new group (2676). Upon selection of the add a new group control (2676), the system may provide a list of all contacts which the user may add or remove from the group by selecting appropriate controls 2780 and 2782, respectively. The user may also enter a group name in the appropriate control 2778. A group action screen 2800 is shown in FIG. 28. A user may select a corresponding control to initiate a group email (2884), group text (2886), or delete the group (2888).

Figure 29:
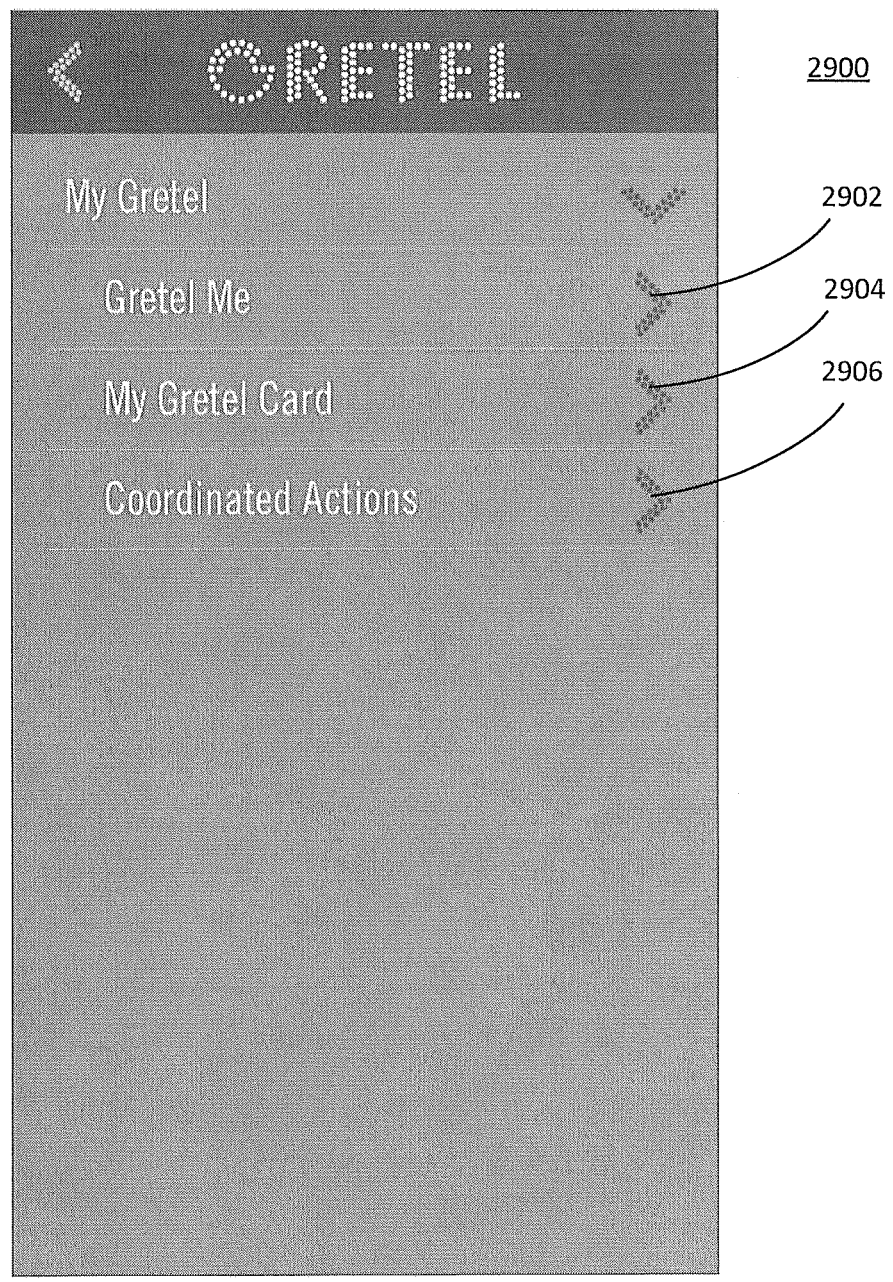
Figure 30:
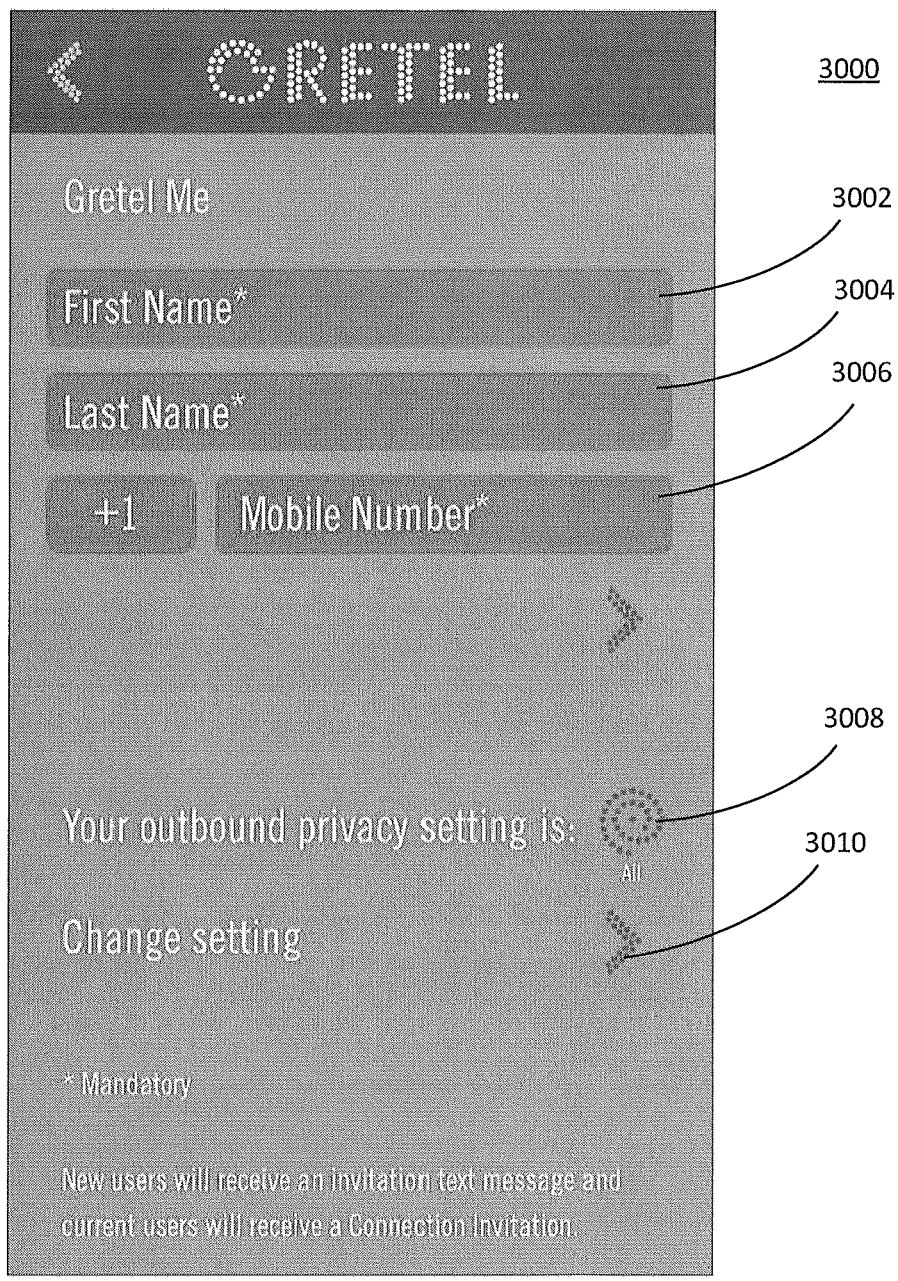

An exemplary user profile management screen 2900 is shown in FIG. 29. In the illustrated example, the user profile management screen 2900 may provide controls for inviting a contact to establish an information sharing relationship (2902), modify their own contact information (2904), and perform coordinated operations (2906). A screen 3000 for generating an invitation to establish an information sharing relationship is shown in FIG. 30. The user may specify the first name, last name, and mobile phone number for invitation recipient via controls 3002, 3004 and 3006, respectively. The user may also use a default privacy setting corresponding to the types of contact information to be shared with the recipient (shown at 3008) or modify that setting via control (3010).

Figure 31:
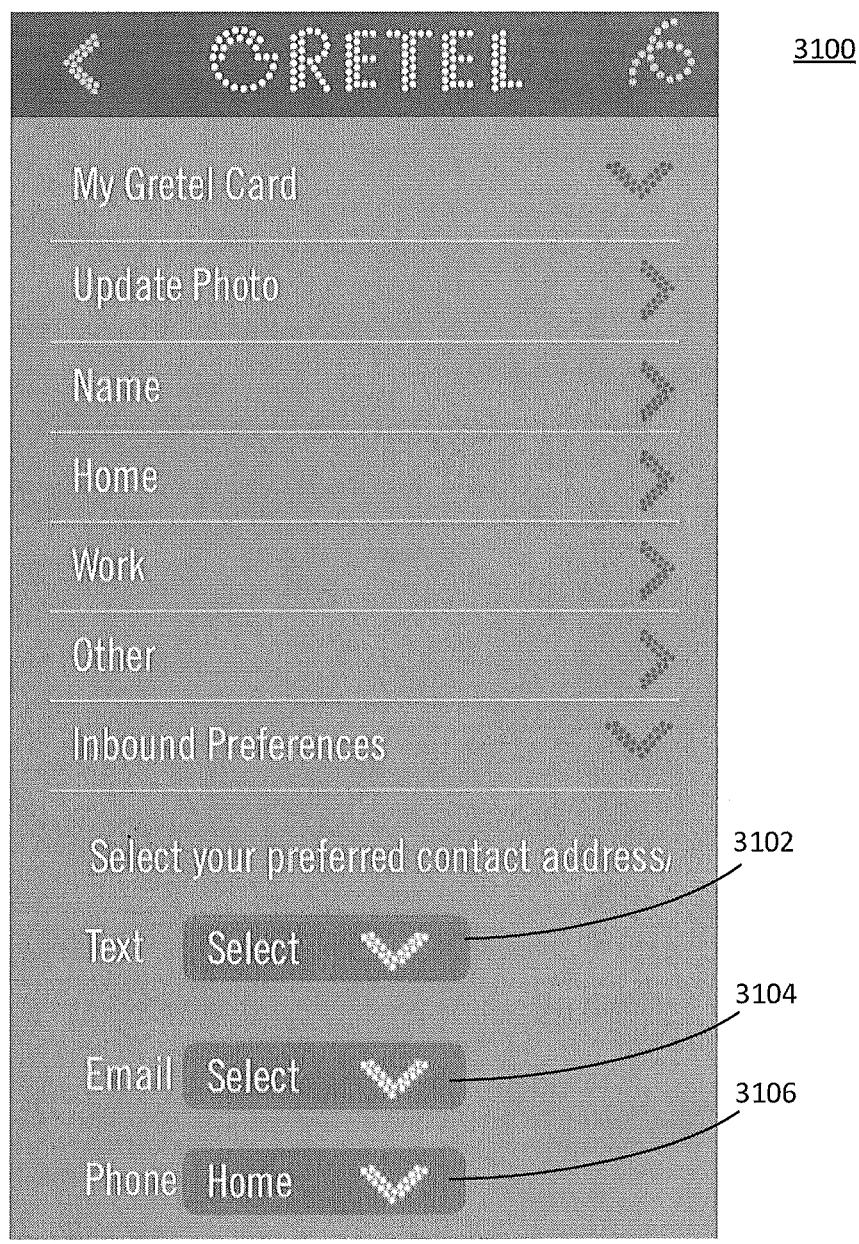

FIG. 31 shows an exemplary screen 3100 for enabling a user to modify their contact information. The user may, for example, update an associated photo (such as by using an camera integrated in the mobile device or by selecting a file stored on the device) or modify their name, title, suffix, and/or home, work, or other contact information. In one embodiment, a user may specify inbound communications preferences for one or more methods of contact, such as a preferred email address, a preferred phone number, a preferred text number or other method of communication. The preferences may be linked so that other registered users in contact sharing relationships with the user are directed to use these contact methods, such as by linking the preferred contact methods to various interface controls, such as those described above with respect to FIG. 13. In one embodiment, inbound communication preferences may be set on an individual basis for each contact in user's phonebook. Alternatively, or additionally, the setting may be a global setting, a group setting, or a mix of any or all types of settings (such as by applying a default setting if no specific option is associated with a given contact). Other options and variations may also be provided.

Figure 32:
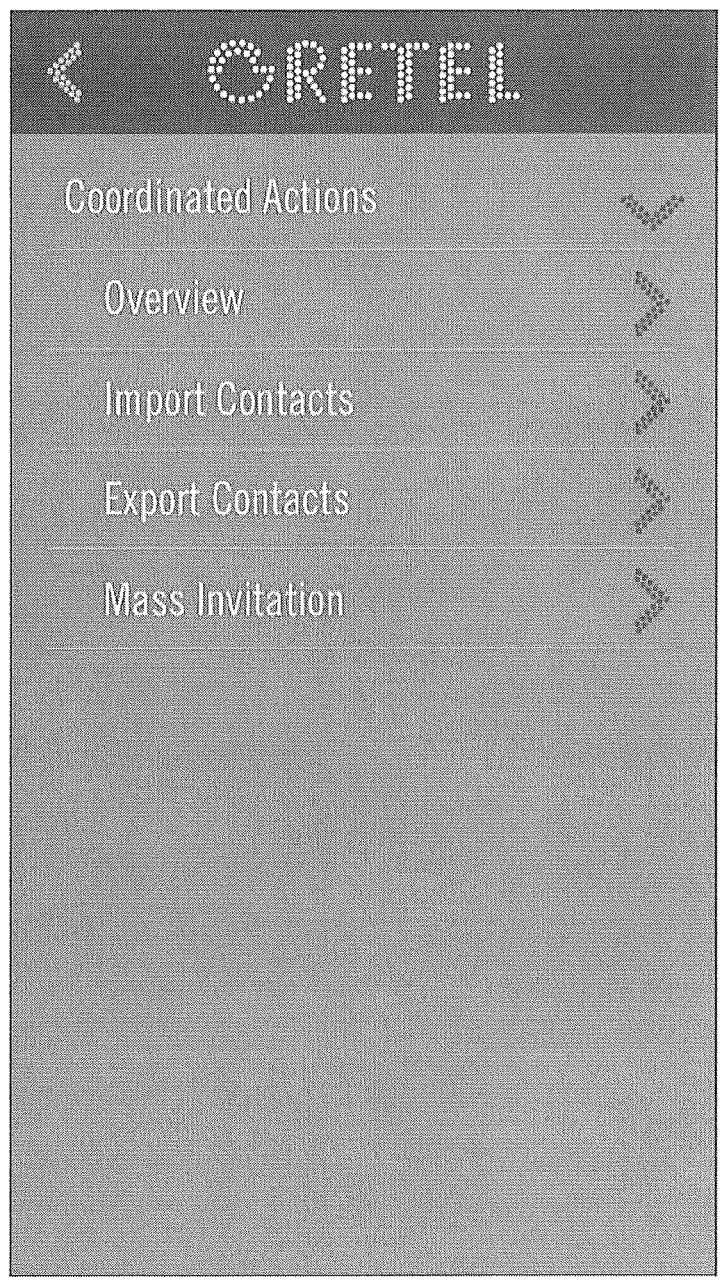
Figure 33:

Coordinated operations may include, for example, operations that act on multiple contacts. For example, coordinated actions may include options for importing contacts, exporting contacts, or inviting all non-updating contacts to establish information sharing relationships, as shown in FIG. 32. For example, to export contacts, a comma separated value file (.CSV) including all of a user's contacts may be generated. In one embodiment, a user may be prompted to enter an email address and password for sending the .CSV file to the user, as shown in FIG. 33.

Figure 34:
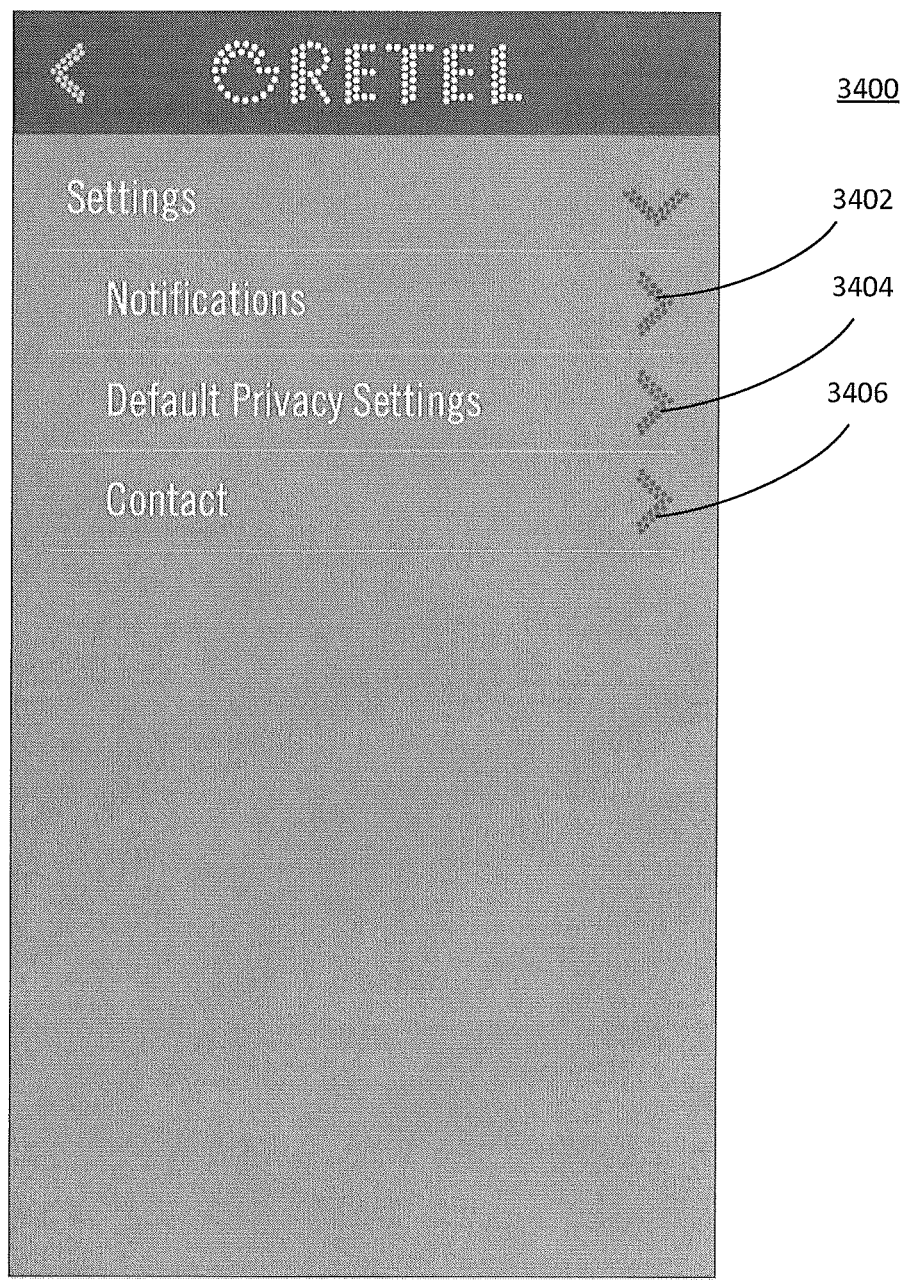
Figure 35:
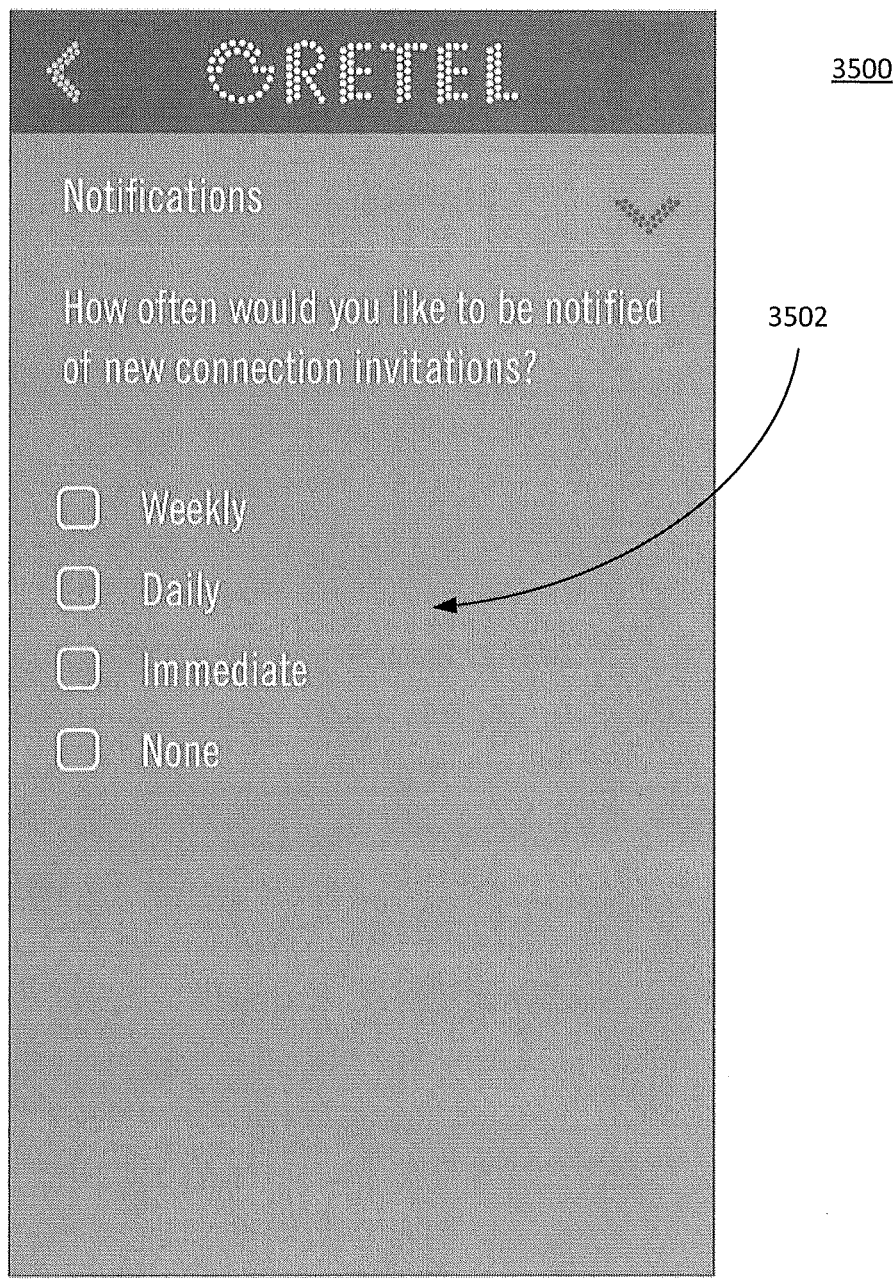
Figure 36:
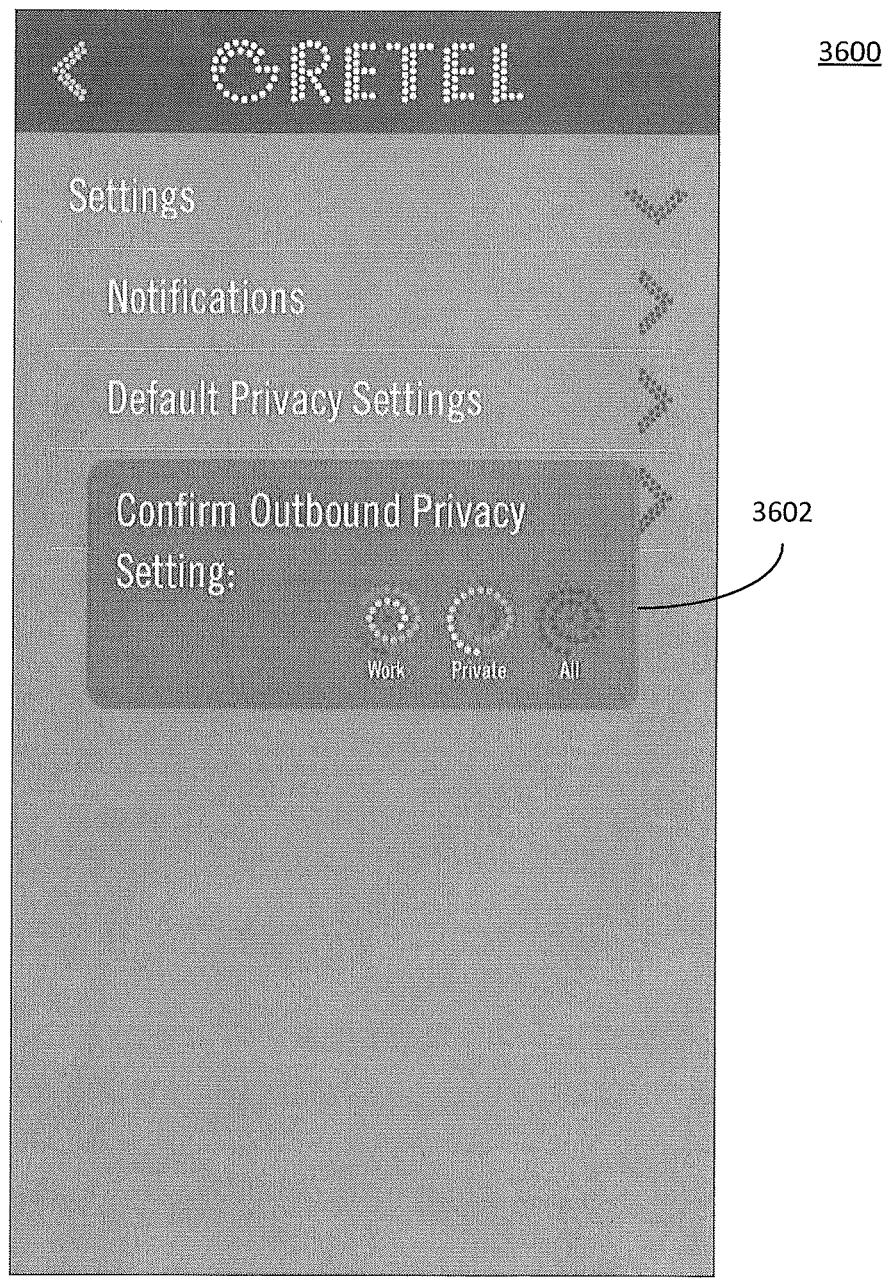

An exemplary other settings menu is shown in FIG. 34. Other settings may include notification settings and default privacy settings. Notifications settings may indicate how often new invitations are provided to a user. For example, in the example illustrated in FIG. 35, a user may select to be notified immediately, on a daily or weekly basis, or never. Other time periods may also be used. As shown in FIG. 36, default privacy settings may correspond to the types of contact information to be shared with the recipient (3602). For example, a user may share work information, private information, or both. Other types of information at various levels of granularity may also be used.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

APPENDIX A

TABLE 1

USER_SIGNUP

| Data Record Parameter | Description |
| --- | --- |
| id | Record ID |
| f_name | User first name |
| m_name | User middle name |
| l_name | User last name |
| Prefix | User's prefix(e.g: Ms, Mrs) |
| Suffix | User's Suffix(e.g: junior, doctor) |
| work_email | Working Email |
| Password | User login password |
| ph_no | User Login contact number |
| home_phone | User residence contact number |
| home_email | User home email-id |
| home_address | User residence address |
| work_address | User working place address |
| other_address | Additional address field |
| company_name | User Company name |
| work_title | User occupation(e.g: engineer, doctor) |
| photo | User picture |

TABLE 1-continued

USER_SIGNUP

| Data Record Parameter | Description |
| --- | --- |
| auth_num | Confirmation code(one time code which sent on mobile number) |
| user_dt | Timestamp |
| Status | User status |
| email_status | Is news status of Gretel is enable or disable |
| check_flag | For contact synchronization flag |
| u_name | Home email Id |

TABLE 2

USER_SIGNUP_TEMP

| Data Record Parameter | Description |
| --- | --- |
| Mobile | Registered mobile number |
| auth_num | Confirmation code(one time code which sent on mobile number) |
| user_dt | Timestamp |
| Status | If confirmation code match then status true. |

TABLE 3

USER_CONTACTS

| Data Record Parameter | Description |
| --- | --- |
| id | Record ID |
| user_id | Unique ID of user entity |
| fname | User first name |
| mname | User middle name |
| lname | User last name |
| prefix | User's prefix(e.g: Ms, Mrs) |
| suffix | User's Suffix(e.g: junior, doctor) |
| work_no | Work place number |
| mobile_no | User mobile number |
| home_no | User residence number |
| work_email | User office email-id |
| home_email | User home email-id |
| work_address | User office address |
| home_address | User residence address |
| org_name | User organization name |
| org_title | User organization title |
| photo | User picture |
| gretel_type | True if contact number is Gretel user's contact number |
| fav_flag | If contact number is favorite then true |
| sync_flag | Phone contacts synchronization. |
| user_dt | Timestamp |
| fav_order | List the priority of favorite contacts order and update when contacts number drag up or down on favorite screen. |

TABLE 4

INVITE_GRETEL

| Data Record Parameter | Description |
| --- | --- |
| id | Record id |
| sender_id | Sender id through which invitation send |
| share_type | There are 3 share type of information<br>1. ALL<br>2. Private<br>3. public<br>(e.g: if user want share information to all then set it to "ALL") |

TABLE 4-continued

INVITE_GRETEL

| Data Record Parameter | Description |
| --- | --- |
| receiver_id | ID of receiver who received invitation. |
| user_dt | Timestamp |
| status | If invitation accept then status true |

TABLE 5

INVITE_GRETEL_ME

| Data Record Parameter | Description |
| --- | --- |
| id | Record id |
| to_user_id | Gretel user Id through which invitation sent on Gretel me screen. |
| fname | User firstname on Gretel me screen |
| lname | User lastname on Gretel me screen |
| from_number | User mobile number from which invitation sent on Gretel me screen |
| to_share_type | Sender user share type(All, Public, Private) on Gretel me screen |
| invite_dt | Invitation's timestamp |
| status | If invitation accepted then true |

TABLE 6

GROUP

| Data Record Parameter | Description |
| --- | --- |
| id | Record id |
| user_id | Id of the user entity |
| group_name | Name of the group |
| status | If group created then true. |

TABLE 7

GROUP_MEMBER

| Data Record Parameter | Description |
| --- | --- |
| id | Record id |
| group_id | ID of created group |
| member_id | Id of group Member |
| status | If member then active |

TABLE 8

ADMIN_LOGIN

| Data Record Parameter | Description |
| --- | --- |
| id | Record id |
| username | Admin Login username |
| password | Admin Login password |
| status | If admin is sign in |

TABLE 9

ADMIN_NOTIFICATION

| Data Record Parameter | Description |
| --- | --- |
| id | Record id |
| to | Gretel user Mobile number in which notification send. |
| message | Message body |
| user_dt | timestamp |

APPENDIX B

```
Login API
    <api name="login">
    <method>post</method>
    <parameter>
        <parameter name="mobile" / >
        <parameter name="pwd" / >
    </parameter>
    <response>
        <response name="status" />
        <response name="data" />
    </response>
    </api>
Signup API
    <api name="signup">
    <method>post</method>
    <parameter>
    <parameter name="ph_no" />
    </parameter>
    <response>
        <response name="status" />
        <response name="data" />
    </response>
    </api>
Verification API
    <api name="verification">
    <method>post</method>
    <parameter>
    <parameter name="fname" />
    <parameter name="lname" />
    <parameter name="mobile " />
    <parameter name="pwd" />
    <parameter name="u_mail" />
    <parameter name="email_status" />
    <parameter name="auth_num" />
    </parameter>
    <response>
        <response name="status" />
        <response name="data" />
    </response>
    </api>
ResendCode API
    <api name="resendcode">
    <method>post</method>
    <parameter>
    <parameter name="mobile" />
    </parameter>
    <response>
        <response name="status" />
        <response name="data" />
    </response>
    </api>
Signuptbl API
    <api name="signuptbl">
    <method>get</method>
    <parameter>
    <parameter name="fname" />
    <parameter name="lname" />
    <parameter name="mobile " />
    <parameter name="pwd" />
    <parameter name="u_mail" />
    <parameter name="email_status" />
    </parameter>
    <response>
```

```
                    <response name="status" />
                    <response name="data" />
            </response>
        </api>
FetchContacts API
    <api name="fetchcontacts">
        <method>post</method>
        <parameter>
            <parameter name="id" />
            <parameter name="fname" />
            <parameter name="mname" />
            <parameter name="lname" />
            <parameter name="prefix" />
            <parameter name="suffix" />
            <parameter name="work_no" />
            <parameter name="mobile_no" />
            <parameter name="home_no" />
            <parameter name="work_email" />
            <parameter name="home_email" />
            <parameter name="work_address" />
            <parameter name="home_address" />
            <parameter name="org_name" />
            <parameter name="org_title" />
            <parameter name="user_id" />
        </parameter>
        <response>
            <response name="status" />
            <response name="data" />
        </response>
    </api>
FavContact API
    <api name="favcontact">
        <method>post</method>
        <parameter>
            <parameter name="fav_flag" />
            <parameter name="contact_id" />
            <parameter name="user_id" /></parameter>
        <response>
            <response name="status" />
            <response name="data" />
        </response>
    </api>
FavOrder API
    <api name="favorder">
        <method>get</method>
        <parameter>
            <parameter name="user_id" />
            <parameter name="contact_id" />
            <parameter name="fav_order" />
        </parameter>
        <response>
            <response name="status" />
            <response name="data" />
        </response>
    </api>
GetContact API
    <api name="getcontact">
        <method>post</method>
        <parameter>
            <parameter name="user_id" /></parameter>
        <response>
            <response name="status" />
            <response name="data" />
        </response>
    </api>
GretelCard API
    <api name="gretelcard">
        <method>post</method>
        <parameter>
            <parameter name="user_id" />
        </parameter>
        <response>
            <response name="status" />
            <response name="data" />
        </response>
    </api>
SaveGretelCard API
    <api name="savegretelcard">
        <method>post</method>
        <parameter>
            <parameter name="f_name" />
            <parameter name="m_name" />
            <parameter name="l_name" />
            <parameter name="prefix" />
            <parameter name="suffix" />
            <parameter name="work_email" />
            <parameter name="home_email" />
            <parameter name="ph_no" />
            <parameter name="home_address" />
            <parameter name="home_text" />
            <parameter name="home_fax" />
            <parameter name="work_fax" />
            <parameter name="work_text" />
            <parameter name="work_address" />
            <parameter name="other_address" />
            <parameter name="other_text" />
            <parameter name="other_ph" />
            <parameter name="other_fax" />
            <parameter name="other_email" />
            <parameter name="company_name" />
            <parameter name="work_title" />
            <parameter name="general_work" />
            <parameter name="direct_work" />
            <parameter name="photo" />
            <parameter name="prefer_text" />
            <parameter name="prefer_email" />
            <parameter name="prefer_ph" />
            <parameter name="user_id" />
        </parameter>
        <response>
            <response name="status" />
            <response name="data" />
        </response>
    </api>
GretelMe API
    <api name="gretelme">
        <method>post</method>
        <parameter>
            <parameter name="fname" />
            <parameter name="lname" />
            <parameter name="ph_no" />
            <parameter name="share_type" />
            <parameter name="user_id" /></parameter>
        <response>
            <response name="status" />
            <response name="data" />
        </response>
    </api>
DeleteContact API
    <api name="deletecontact">
        <method>post</method>
        <parameter>
            <parameter name="ph_no" />
            <parameter name="user_id" /></parameter>
        <response>
            <response name="status" />
            <response name="data" />
        </response>
    </api>
InviteGretel API
    <api name="invitegretel">
        <method>post</method>
        <parameter>
            <parameter name="user_id" />
            <parameter name="share_type" />
            <parameter name="receiver_id" />
        </parameter>
        <response>
            <response name="status" />
            <response name="data" />
        </response>
    </api>
AddGroup API
    <api name="addgroup">
        <method>post</method>
        <parameter>
            <parameter name="group_id" />
            <parameter name="group_name" />
```

-continued

```
            <parameter name="member_id" />
            <parameter name="user_id" />
        </parameter>
        <response>
            <response name="status" />
            <response name="data" />
        </response></api>
GetGroupList API
    <api name="getGroupList">
        <method>post</method>
        <parameter>
        <parameter name="user_id" /></parameter>
        <response>
            <response name="status" />
            <response name="data" />
        </response>
    </api>
ViewGroup API
    <api name="viewgroup">
        <method>post</method>
        <parameter>
        <parameter name="group_id" /></parameter>
        <response>
            <response name="status" />
            <response name="data" />
        </response>
    </api>
EditGroup API
    <api name="editgroup">
        <method>post</method>
        <parameter>
        <parameter name="group_id" />
        <parameter name="group_name" />
        <parameter name="member_id" /></parameter>
        <response>
            <response name="status" />
            <response name="data" />
        </response></api>
DeleteGroup API
    <api name="deletegroup">
        <method>post</method>
        <parameter><parameter name="group_id" /></parameter>
        <response>
            <response name="status" />
            <response name="data" />
        </response>
    </api>
ReceiveInvitation API
    <api name="receiveinvitation">
        <method>post</method>
        <parameter><parameter name="user_id" /></parameter>
        <response>
            <response name="status" />
            <response name="data" />
        </response>
    </api>
Notification API
    <api name="notification">
        <method>post</method>
        <parameter><parameter name="user_id" /></parameter>
        <response>
            <response name="status" />
            <response name="data" />
        </response>
    </api>
AfterNotification API
    <api name="afternotification">
        <method>post</method>
        <parameter>
        <parameter name="user_id" /></parameter>
        <response>
            <response name="status" />
            <response name="data" />
        </response>
    </api>
CSV Export API
    <api name="csvexport">
        <method>post</method>
        <parameter>
```

-continued

```
            <parameter name="user_id" />
            <parameter name="email_id" />
            <parameter name="password" />
        </parameter>
        <response>
            <response name="status" />
            <response name="data" />
        </response>
    </api>
SendStatus API
    <api name="sendstatus">
        <method>post</method>
        <parameter><parameter name="user_id" /></parameter>
        <response>
            <response name="status" />
            <response name="data" />
        </response>
    </api>
```

We claim:

1. A contact management system, comprising:
a first software module for use on a mobile device associated with a first user, the first software module including instructions stored on a non-transitory computer readable medium that:
receives contact information of the first user;
transmits the contact information of the first user to a server computer;
receives contact information for each of a first entity and a second entity, the contact information comprising a phone number;
transmits the contact information of the first entity and the second entity to the server computer; and
a second software module for use on the server computer, stored on a non-transitory computer readable medium that:
receives the contact information of the first user;
creates an account associated with the first user;
receives the contact information for the first entity and the second entity;
determines that the first entity corresponds to a registered user of the contact management system by comparing the contact information for the first entity to a phone number associated with the registered user;
determines that the second entity does not correspond to any registered users of the contact management system;
establishes a contact information sharing relationship between the first user and the first entity only if the contact information for the first entity corresponds to the phone number of the registered user;
retrieves previously stored contact information for the first entity; and
stores, in a collection of data associated with the first user, the contact information of the first user, the retrieved contact information for the first entity, and the received contact information for the second entity.

2. The contact managing system of claim 1, where the first software module further includes instructions that import contact information from another contact management system.

3. The contact management system of claim 1, where the instructions that determine that the first entity corresponds to a registered user of the contact management system makes that determination based on the contact information for the first contact.

4. The contact management system of claim 3, where the instructions that establish a contact information sharing relationship between the first user and the first entity further comprise instructions that send an invitation to the first entity.

5. The contact management system of claim 4, where the second software module further includes instructions that provide the invitation to the first entity in accordance with a communication preference.

6. The contact management system of claim 5, where the communication preference specifies a time period.

7. The contact management system of claim 3, where the contact information for the first entity includes a phone number and where the determining that the first entity corresponds to a registered user of the contact management system is based on the phone number for the first entity.

8. The contact management system of claim 1, where the first software module further includes instructions that store the contact information of the first user, the retrieved contact information for the first entity, and the contact information second entity on the mobile device.

9. The contact management system of claim 1, where the previously stored contact information for the first entity includes an inbound communication preference for the first contact, and
where the first software module further includes instructions that associate the inbound communication preference for the first entity with a user interface control provided to the first user.

10. The contact management system of claim 9, where the inbound communication preference for the first entity specifies at least one of an email address and a phone number.

11. The contact management system of claim 1, where the registered user is a commercial entity and where the second software module further includes instructions that cause the first user to be compensated for establishing a contact information sharing relationship with the registered user.

12. A method for managing contact information, comprising:
receiving, by a first software module running on a mobile device, contact information of a first user;
transmitting, by the first software module, the contact information of the first user to a server computer;
receiving, by a second software module running on the server computer, the contact information of the first user
creating, by the second software module, an account associated with the first user on a contact management system;
receiving, by the first software module, contact information comprising a phone number for each of a first entity and a second entity;
transmitting, by the first software module, the contact information of the first entity and the second entity to the server computer; and
receiving, by the second software module, the contact information for the first entity and the second entity;
determining, by the second software module, that the first entity corresponds to a registered user of the contact management system by comparing the contact information for the first entity to a phone number associated with the registered user,
determining, by the second software module, that the second entity is not a registered user of the contact management system,
establishing, by the second software module, a contact information sharing relationship between the first user and the first entity only if the contact information for the first entity corresponds to the phone number of the registered user;
retrieving, by the second software module, previously stored contact information for the first entity; and
storing, by the second software module, in a collection of data associated with the first user, the contact information of the first user, the retrieved contact information for the first entity, and the received contact information for the second entity.

13. The method of claim 12, further including importing, by the first software module, contact information from another contact management system.

14. The method of claim 12, where the determining that the first entity corresponds to a registered user of the contact management system is based on the contact information for the first contact.

15. The method of claim 14, where the establishing a contact information sharing relationship between the first user and the first entity includes sending an invitation to the first entity.

16. The method of claim 15, further including providing, by the second software module, the invitation to the first entity in accordance with a communication preference.

17. The contact management system of claim 16, where the communication preference specifies a time period.

18. The method of claim 12, further including storing, by the first software module, the contact information of the first user, the retrieved contact information of the first entity, and the received information of the second entity on the mobile device.

19. The contact management system of claim 12, where the previously stored contact information for the first entity includes an inbound communication preference for the first entity, and
where the method further includes associating, by the first software module, the inbound communication preference for the first entity with a user interface control provided to the first user.

20. The method of claim 19, where the inbound communication preference for the first entity specifies at least one of an email address and a phone number.

* * * * *